United States Patent
Kodama et al.

(10) Patent No.: US 10,534,987 B2
(45) Date of Patent: Jan. 14, 2020

(54) IMAGE PROCESSING APPARATUS IMAGE PROCESSING METHOD AND PROGRAM

(71) Applicant: CANON KABUSHIKI KAISHA, Tokyo (JP)

(72) Inventors: Shigeo Kodama, Tokyo (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/290,247

(22) Filed: Mar. 1, 2019

(65) Prior Publication Data
US 2019/0197373 A1 Jun. 27, 2019

Related U.S. Application Data

(63) Continuation of application No. 15/397,629, filed on Jan. 3, 2017, which is a continuation of application (Continued)

(30) Foreign Application Priority Data

Jun. 18, 2014 (JP) .................. 2014-125739
Jun. 10, 2015 (JP) .................. 2015-117268

(51) Int. Cl.
*G06K 15/02* (2006.01)
*G06T 3/40* (2006.01)
(Continued)

(52) U.S. Cl.
CPC ..... *G06K 15/1877* (2013.01); *G06K 15/1822* (2013.01); *G06T 3/40* (2013.01);
(Continued)

(58) Field of Classification Search
None
See application file for complete search history.

(56) References Cited

U.S. PATENT DOCUMENTS

| 4,926,251 A | 5/1990 | Sekizawa et al. |
| 4,969,052 A | 11/1990 | Ishida et al. |

(Continued)

FOREIGN PATENT DOCUMENTS

| CN | 1909592 A | 2/2007 |
| CN | 101390381 A | 3/2009 |

(Continued)

OTHER PUBLICATIONS

H01-251955 Japanese Notification of Reason for Refusal from Japan Patent Office dated Jul. 24, 2018, and English translation of H01-251955 Japanese Notification of Reason for Refusal, 14 pages.

*Primary Examiner* — Anh-Vinh T Nguyen
(74) *Attorney, Agent, or Firm* — Canon USA, Inc., IP Division

(57) ABSTRACT

An image processing apparatus includes a target value calculation unit configured to calculate a target value to be output in a predetermined region in input image data based on pixel values of pixels included in the region, a distribution order determination unit configured to determine a distribution order of output values for distributing output values corresponding to the target value in the region based on a pixel value of each pixel included in the region and a threshold value in the threshold matrix corresponding to the pixel, and an output value determination unit configured to determine an output value of each pixel included in the region by allocating the target value to at least one pixel included in the region in the distribution order.

11 Claims, 18 Drawing Sheets

Related U.S. Application Data

No. 14/739,368, filed on Jun. 15, 2015, now Pat. No. 9,569,706.

(51) Int. Cl.
*H04N 1/405* (2006.01)
*H04N 1/407* (2006.01)

(52) U.S. Cl.
CPC ........... *H04N 1/405* (2013.01); *H04N 1/4051* (2013.01); *H04N 1/4074* (2013.01)

(56) References Cited

U.S. PATENT DOCUMENTS

| | | |
|---|---|---|
| 4,972,260 A | 11/1990 | Fujikawa et al. |
| 5,086,484 A | 2/1992 | Katayama et al. |
| 5,187,521 A | 2/1993 | Shimizu et al. |
| 5,264,840 A | 11/1993 | Wells et al. |
| 5,293,195 A | 3/1994 | Berlad et al. |
| 5,434,414 A | 7/1995 | Berlad et al. |
| 5,701,366 A | 12/1997 | Ostromoukhov et al. |
| 5,737,453 A | 4/1998 | Ostromoukhov |
| 5,832,112 A | 11/1998 | Funada et al. |
| 5,917,963 A | 6/1999 | Miyake |
| 6,954,542 B2 | 10/2005 | Miyake et al. |
| 7,372,594 B1 | 5/2008 | Kusakabe et al. |
| 7,471,847 B2 | 12/2008 | Yano |
| 8,259,180 B2 | 9/2012 | Ogasawara |
| 8,576,243 B2 | 11/2013 | Morovic et al. |
| 8,611,655 B2 | 12/2013 | Bryant et al. |
| 8,749,847 B2 | 6/2014 | Hara et al. |
| 8,833,898 B2 | 9/2014 | Shibasaki |
| 8,842,911 B2 | 9/2014 | Pettigrew et al. |
| 8,864,266 B2 | 10/2014 | Suzuki et al. |
| 9,108,403 B2 | 8/2015 | Kawatoko et al. |
| 9,126,403 B2 | 9/2015 | Ojiro et al. |
| 9,261,829 B2 | 2/2016 | Yamamoto |
| 9,807,281 B2 | 10/2017 | Kajiwara et al. |
| 9,817,119 B2 | 11/2017 | Kobayashi et al. |
| 9,961,231 B2 | 5/2018 | Iguchi et al. |
| 2003/0053658 A1 | 3/2003 | Pavlidis |
| 2003/0071873 A1 | 4/2003 | Kakutani et al. |
| 2004/0080790 A1 | 4/2004 | Abe |
| 2004/0155916 A1 | 8/2004 | Uchiyama et al. |
| 2005/0058476 A1* | 3/2005 | Murakami ........... G03G 21/043 399/366 |
| 2005/0219634 A1* | 10/2005 | Murakami ......... H04N 1/00838 358/3.28 |
| 2005/0259885 A1 | 11/2005 | Yamazaki |
| 2006/0152764 A1 | 7/2006 | Loce et al. |
| 2006/0221358 A1* | 10/2006 | Takahashi .......... H04N 1/00432 358/1.1 |
| 2006/0227379 A1* | 10/2006 | Kakutani ............. H04N 1/4105 358/3.01 |
| 2007/0047809 A1 | 3/2007 | Sasaki |
| 2007/0115490 A1* | 5/2007 | Yada .................... H04N 1/4057 358/1.13 |
| 2007/0115506 A1* | 5/2007 | Yada ................ H04N 1/40068 358/3.06 |
| 2007/0171439 A1* | 7/2007 | Kakutani ............... B41J 2/2128 358/1.9 |
| 2008/0123148 A1 | 5/2008 | Takahashi et al. |
| 2008/0186348 A1* | 8/2008 | Yanai ................... G06K 15/107 347/15 |
| 2008/0259361 A1 | 10/2008 | Kakutani |
| 2008/0278596 A1 | 11/2008 | Machida et al. |
| 2009/0080002 A1 | 3/2009 | Nakano et al. |
| 2009/0097045 A1* | 4/2009 | Miyata ................... H04N 1/405 358/1.9 |
| 2009/0175496 A1 | 7/2009 | Kondo et al. |
| 2009/0284782 A1 | 11/2009 | Murakami |
| 2010/0008573 A1 | 1/2010 | Tajbakhsh et al. |
| 2010/0182637 A1 | 7/2010 | Tamura |
| 2010/0220364 A1 | 9/2010 | Picard et al. |
| 2010/0231631 A1 | 9/2010 | Hosaka |
| 2011/0080615 A1 | 4/2011 | Ono et al. |
| 2011/0085183 A1 | 4/2011 | Tsuchiya et al. |
| 2011/0102869 A1* | 5/2011 | Hirayama .......... H04N 1/40012 358/518 |
| 2011/0141503 A1 | 6/2011 | Blum |
| 2012/0019849 A1 | 1/2012 | Moribe |
| 2012/0086986 A1* | 4/2012 | Hara .................... H04N 1/4052 358/3.06 |
| 2012/0242734 A1 | 9/2012 | Kakutani et al. |
| 2012/0257256 A1 | 10/2012 | Wakui |
| 2012/0307273 A1* | 12/2012 | Jinno .................... B41J 2/2107 358/1.9 |
| 2012/0327450 A1 | 12/2012 | Sagan et al. |
| 2013/0002747 A1 | 1/2013 | Shibasaki |
| 2013/0021400 A1 | 1/2013 | Tamagawa |
| 2013/0027543 A1 | 1/2013 | Boeykens et al. |
| 2013/0027751 A1 | 1/2013 | Uchidate et al. |
| 2013/0034296 A1 | 2/2013 | Hattori |
| 2013/0120769 A1* | 5/2013 | Kakutani ............... G06K 15/10 358/1.8 |
| 2013/0128286 A1 | 5/2013 | Tamagawa |
| 2014/0104335 A1 | 4/2014 | Kawatoko et al. |
| 2014/0118389 A1 | 5/2014 | Chen et al. |
| 2014/0139885 A1 | 5/2014 | Nakagawa et al. |
| 2014/0232771 A1 | 8/2014 | Kawatoko et al. |
| 2015/0092241 A1 | 4/2015 | Hori et al. |
| 2015/0181083 A1* | 6/2015 | Kajiwara ............. H04N 1/6027 358/3.05 |
| 2015/0197086 A1 | 7/2015 | Ochiai et al. |
| 2015/0251416 A1 | 9/2015 | Ochiai et al. |
| 2015/0293466 A1* | 10/2015 | Shoji ................... G03G 15/043 358/1.1 |
| 2015/0326842 A1 | 11/2015 | Huai |
| 2015/0371123 A1 | 12/2015 | Kodama et al. |
| 2016/0117576 A1 | 4/2016 | Horita |
| 2016/0283832 A1 | 9/2016 | Shibata |
| 2016/0295077 A1* | 10/2016 | Kakutani ............. H04N 1/6027 |
| 2017/0013166 A1 | 1/2017 | Katsuyama |
| 2017/0041508 A1 | 2/2017 | Kajiwara et al. |
| 2017/0099410 A1* | 4/2017 | Iguchi ................ H04N 1/32315 |
| 2017/0310851 A1 | 10/2017 | Dobashi et al. |
| 2018/0036951 A1* | 2/2018 | Harayama ............. B29C 64/393 |

FOREIGN PATENT DOCUMENTS

| | | |
|---|---|---|
| CN | 101527775 A | 9/2009 |
| CN | 102868846 A | 1/2013 |
| CN | 103369196 A | 10/2013 |
| JP | S61-154273 A | 7/1986 |
| JP | H01-251955 A | 10/1989 |
| JP | 2006-020219 A | 1/2006 |
| JP | 2007-194904 A | 8/2007 |

* cited by examiner

FIG. 10

IMAGE PROCESSING APPARATUS IMAGE PROCESSING METHOD AND PROGRAM

CROSS-REFERENCE TO RELATED APPLICATIONS

This application is a Continuation of U.S. application Ser. No. 15/397,629, filed Jan. 3, 2017, which is a Continuation of U.S. application Ser. No. 14/739,368, filed Jun. 15, 2015, now U.S. Pat. No. 9,569,706, which claims the benefit of priority from Japanese Patent Application No. 2014-125739 filed Jun. 18, 2014, and Japanese Patent Application No. 2015-117268 filed Jun. 10, 2015, each of which are hereby incorporated by reference herein in their entirety.

BACKGROUND OF THE INVENTION

Field of the Invention

The present invention relates to an image processing apparatus and an image processing method which convert image data to higher quality half-tone image data.

Description of the Related Art

Image forming apparatuses such as a printer have been widely used which print an image represented by digital image data input through a computer or a digital camera on a recording medium by using a recording material. In digital image data, pixel values of pixels included in image data are generally represented by multiple tones such as 8 bits or 16 bits for one color. On the other hand, in an image forming apparatus, an image is formed by ON and OFF states of dots with a recording material. Thus, the number of tones which are outputtable by the image forming apparatus is often lower than the number of tones of image data. Generally, half toning is performed on digital image data so that such an image forming apparatus may print an image. From the half-tone image data acquired by the half toning, the image forming apparatus represents a dot pattern to be output on a recording medium and thus represents pseudo-tones of the image.

A type of half toning is called a dither process using a threshold value matrix. The threshold value matrix refers to a matrix in which threshold values are arranged correspondingly to pixels in image data. The dither process is performed on each pixel included in image data by comparing the pixel value and a threshold value corresponding to the pixel to quantize the pixel value of each pixel and thus reduce the number of tones of image data. The threshold value matrix is arranged repetitively in a tile pattern on image data such that threshold values may correspond to all pixels.

Threshold value matrices usable for the dither process may be classified into two types. One type is an FM (frequency modulation) based threshold value matrix in which high and low threshold values are dispersed. The other type is an AM (Amplitude modulation) based threshold value matrix in which the magnitudes of threshold values increase sequentially from one position. In a case where the dither process is performed on image data by using an FM-based threshold value matrix, the resulting half-tone image data represent a dot pattern with dispersed dots and represent pseudo-tones with the number of dots per unit area. In a case where the dither process is performed on image data by using an AM-based threshold value matrix, the resulting half-tone image data represent a dot pattern in which a concentrated plurality of dots are periodically disposed and represent pseudo-tones in accordance with the areas of dots. Even with both of the threshold value matrices, when flat image data are input, the arrangement of threshold values are generally determined in consideration of output characteristics of the image forming apparatus.

However, comparing pixel values of pixels of input image data and corresponding threshold values, the resulting half-tone image data may not represent a desired dot pattern. This may be caused by interference between a characteristic exhibited by input image data and a characteristic of the threshold value matrix. For example, a tone represented by input image data of a partial region may not be reproduced, or a fine line to be reproduced with half-tone image data may have a break in it.

Accordingly, in Japanese Patent Laid-Open No. 2007-194904, an ideal output total value is generated for each region in accordance with an average value of pixel values of a plurality of pixels included in a region corresponding to a threshold value matrix. It is further disclosed that output values are allocated in order from a pixel at a centroid position within a region defined by a pixel value until an ideal output total value is acquired.

According to the disclosure of Japanese Patent Laid-Open No. 2007-194904, the arrangement of dots depends on the centroid position based on pixel values of pixels for each region. Therefore, because the centroid position within a region varies in accordance with a characteristic of input image data, a dot pattern suitable for output from an image forming apparatus may not be set. Furthermore, because the positions of ON dots are determined in order from the centroid position within a region, a characteristic in input image data may not be maintained, resulting in blurred half-tone image data.

SUMMARY OF THE INVENTION

The present invention provides an image processing apparatus which converts digital image data to high-definition, half-tone image data. An image processing apparatus according to the present invention includes a target value calculation unit configured to calculate a target value, to be output in a predetermined region in input image data, based on pixel values of pixels included in the region, a distribution order determination unit configured to determine a distribution order of output values in the region based on a pixel value of each pixel included in the region and a threshold value in the threshold value matrix corresponding to the pixel, and an output value determination unit configured to determine an output value of each pixel included in the region by allocating the target value to at least one pixel included in the region in the distribution order.

Further features of the present invention will become apparent from the following description of exemplary embodiments with reference to the attached drawings.

BRIEF DESCRIPTION OF THE DRAWINGS

FIG. 10 illustrates regions in input image data and processing results.

DESCRIPTION OF THE EMBODIMENTS

Exemplary embodiments of the present invention will be described with reference to the appended drawings. Configurations according to the following exemplary embodiment are given for illustration purpose only, and the present invention is not limited to the illustrated configurations.

Configuration of Image Processing Apparatus

Figure 1:
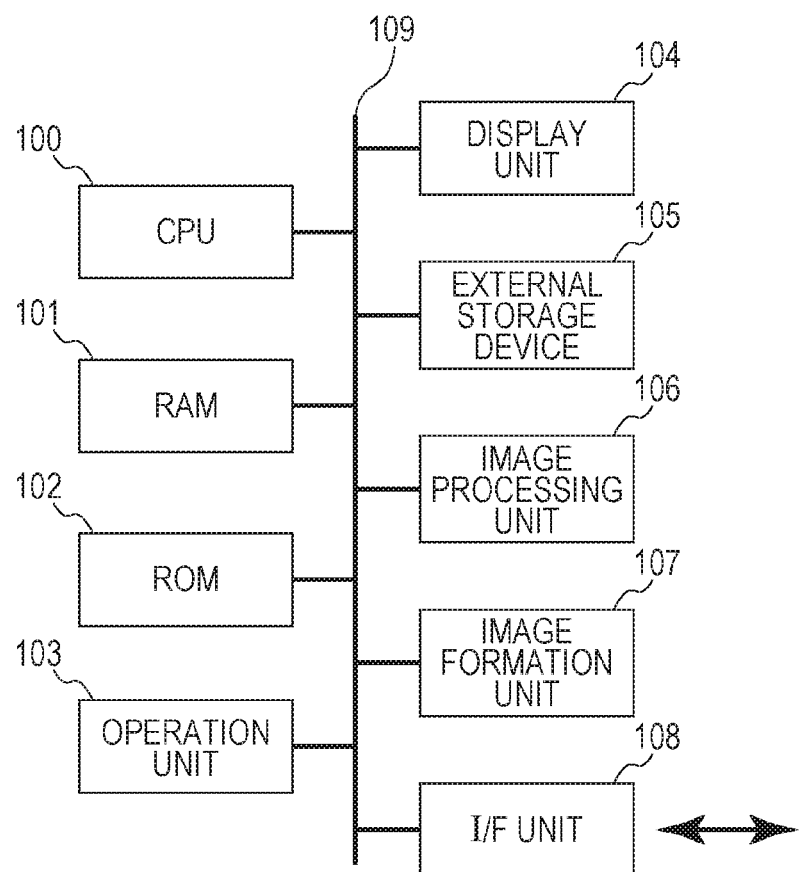
FIG. 1 is a block diagram illustrating a hardware configuration of an image formation system.

FIG. 1 illustrates a hardware configuration of an image formation system including an image processing apparatus applicable to a first exemplary embodiment. An image processing apparatus according to a first exemplary embodiment is an image processing controller, for example, which is provided within a printer configured to form an image by using a recording material on a recording medium. The image formation system according to the first exemplary embodiment includes a CPU 100, a RAM 101, a ROM 102, an operation unit 103, a display unit 104, an external storage device 105, an image processing unit 106, an image formation unit 107, an I/F (interface) unit 108, and a bus 109.

The CPU 100 uses input data or a computer program stored in the RAM 101 or ROM 102, which will be described below to control operations of the entire image formation system. A case where the CPU 100 generally controls the apparatus will be described, for example, and a plurality of hardware components may share in processes to control the entire apparatus.

The RAM 101 has a storage area configured to temporarily store a computer program and data read from the external storage device 105 and data externally received through I/F unit 108. The RAM 101 is usable by the CPU 100 as a storage area for executing a process or a storage area usable by the image processing unit 106 to perform an image process. In other words, the RAM 101 may provide a storage area as required. The ROM 102 stores a setting parameter for settings for components of the image formation system and a boot program.

The operation unit 103 may include a keyboard and a mouse and receives an instruction from an operator through an operation performed by the operator. This allows the operator to input an instruction to the CPU 100.

The display unit 104 includes a CRT or liquid crystal screen and is capable of displaying a result of processing performed by the CPU 100 by using an image and text. In a case where the display unit 104 is a touch panel capable of detecting a touch operation, the display unit 104 may function as a part of the operation unit 103.

The external storage device 105 is a large capacity information storage device such as a hard disk drive. The external storage device 105 may store a computer program causing an operating system (OS) or the CPU 100 to execute a process and data. The external storage device 105 may hold temporary data (such as input and output image data and a threshold value matrices to be used in the image processing unit) generated by a process performed by a component of the apparatus. A computer program and data stored in the external storage device 105 is read as required under control of the CPU 100, is stored in the RAM 101, and is to be processed by the CPU 100.

The image processing unit 106 is implemented as a computer program executable processor or a dedicated image processing circuit and executes an image process for converting image data input as a printing subject to image data outputtable by the image formation unit 107. For example, in response to an instruction to execute an image process from the CPU 100, N-tone input image data stored in the external storage device 105 are processed, and M-tone output image data are output.

The image formation unit 107 forms an image by using a recording material on a recording medium based on output image data received from the image processing unit 106. The image formation unit 107 according to the first exemplary embodiment is of an ink-jet type which forms an image by discharging ink from a nozzle onto a recording medium. The image formation unit 107 may be of an electrophotography type which forms an image by exposing electrostatically charge image carriers to light, developing an image with toner, and transferring the toner image on a recording medium.

The I/F unit 108 functions as an interface for connecting the image formation system and an external device according to this exemplary embodiment. The I/F unit 108 further functions as an interface for connecting to the Internet for exchanging data with a communication device by an infrared communication or a wireless LAN. All of the components are connected to the bus 109 and perform data exchange through the bus 109.

Configuration of Image Processing Unit 106

Figure 2:
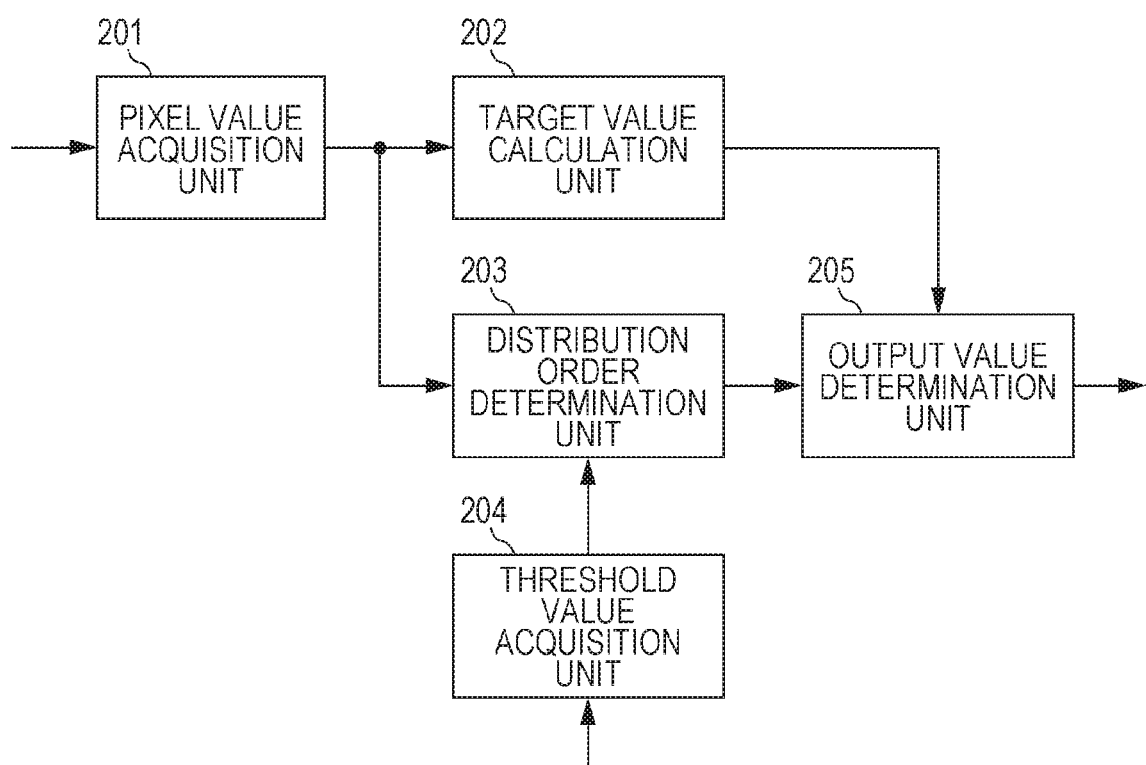
FIG. 2 is a block diagram illustrating a configuration of an image processing unit.

The image processing unit 106 applicable to the first exemplary embodiment will be described. The image processing unit 106 executes half toning for converting input image data to half-tone image data representing a number of tones lower than a number of tones representing the input image data. FIG. 2 is a block diagram illustrating details of the configuration of the image processing unit 106. The image processing unit 106 according to this exemplary embodiment is implemented as a dedicated image processing circuit included in the block diagram illustrated in FIG. 2. The image processing unit 106 has a pixel value acquisition unit 201, a target value calculation unit 202, a distribution order determination unit 203, a threshold value acquisition unit 204, and an output value determination unit 205.

Digital image data (hereinafter, called input image data) to be input to the image processing unit 106 are 8-bit data indicating a value of one of 0 to 255 for each pixel. The image processing unit 106 in this exemplary embodiment converts 8-bit input image data for each one pixel to 1-bit binary half-tone image data (output image data) having a value of either 0 or 1 for each pixel. In half-tone image data, a pixel having a pixel value (output value) 0 represents an OFF dot while a pixel having a pixel value (output value) 1 represents an ON dot. Such half-tone image data reproduces input image data with a lower number of tones than the number of tones representing input image data.

Figure 3:
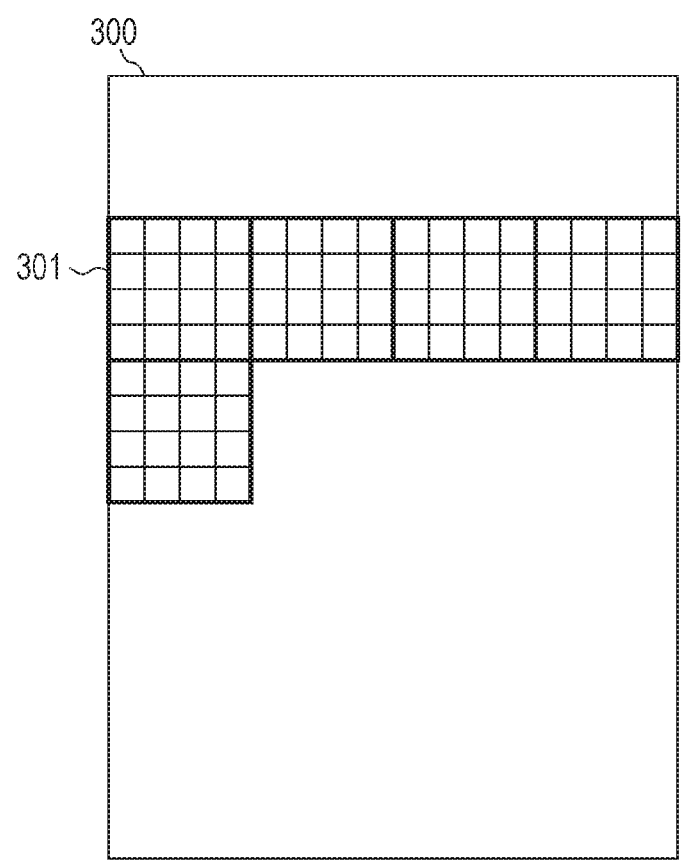
FIG. 3 illustrates a configuration example of input image data.

The pixel value acquisition unit 201 acquires pixel values of a plurality of pixels included in a unit region (hereinafter, called a subject region) to be processed in input image data. FIG. 3 illustrates input image data 300. According to this exemplary embodiment, a 4×4 pixel region indicated by a thick frame in FIG. 3 is a unit region. The pixel value acquisition unit 201 acquires each pixel value of 16 pixels included in a region 301 if the region 301 is a subject region.

The target value calculation unit 202 calculates a sum of output values in the subject region as a target value based on pixel values of a plurality of pixels included in the subject region. Because the output values 1 and 0 represent ON and OFF dots as described above, the sum (target value) of output values in the unit region corresponds to the number of dots which should be ON dots in the unit region. According to this exemplary embodiment, a target value is acquired by dividing the sum of pixel values of a plurality of pixels included in the subject region by 255 (where the fractional portion of the value is dropped).

Figure 4:
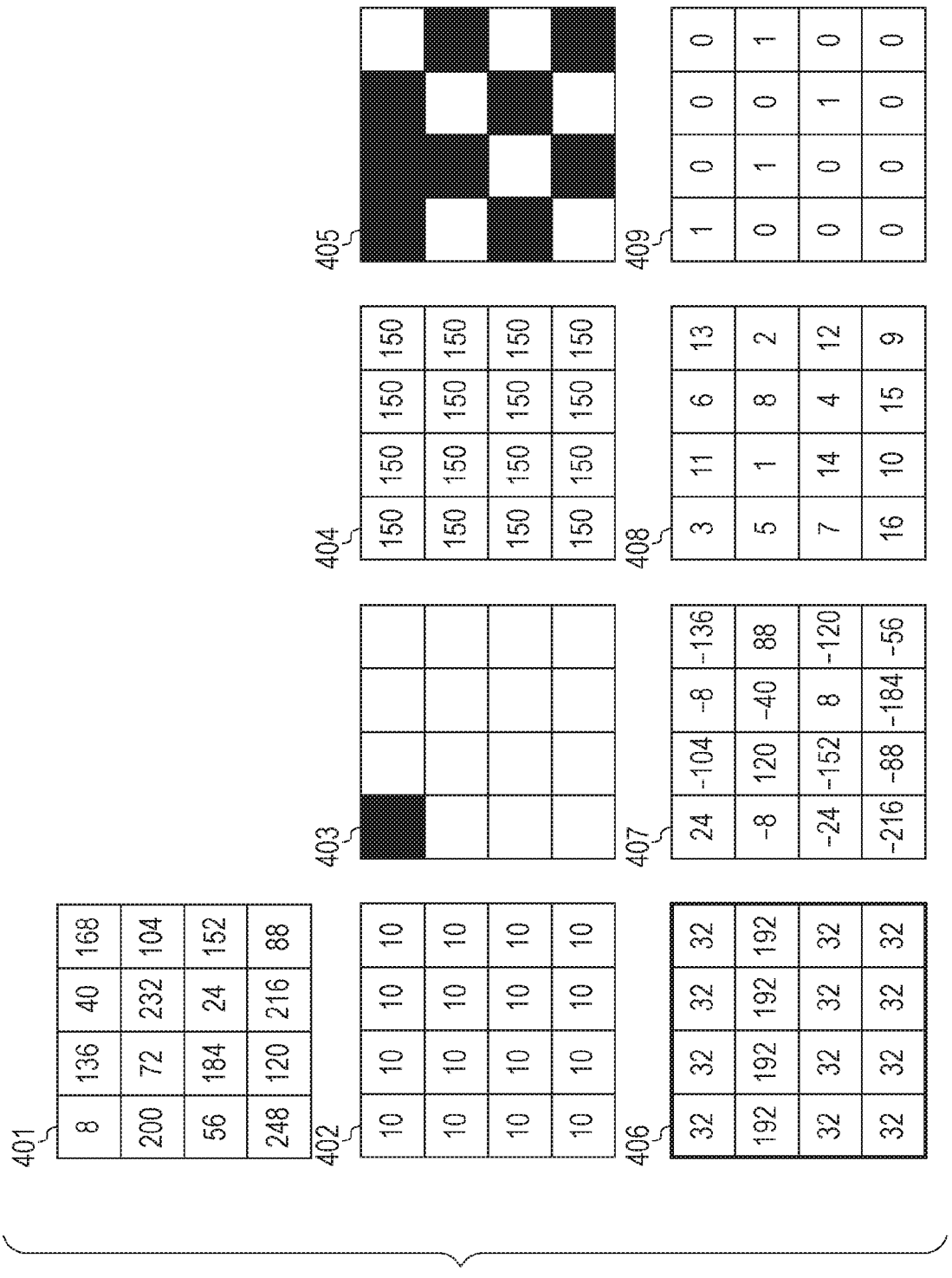
FIG. 4 illustrates threshold value matrices and a dither process with threshold value matrices.

The threshold value acquisition unit 204 acquires a threshold value group usable for a dither process from the RAM 101 or an external storage device 105. According to this exemplary embodiment, a threshold value matrix 401 illustrated in FIG. 4 is used. The threshold value matrix 401 has threshold values having different values for pixels within the matrix. Details thereof will be described below. Because the threshold value matrix and a processing unit region have an equal size (4×4 pixels), the threshold value acquisition unit 204 acquires the threshold value matrix 401 illustrated in FIG. 4 every time the processing unit region is read.

The distribution order determination unit 203 determines a distribution order of dots in the subject region based on pixel values of the subject region acquired from the pixel value acquisition unit 201 and the threshold values acquired from the threshold value acquisition unit 204. According to this exemplary embodiment, difference values between pixel values and threshold values which correspond to each other positionally are calculated as evaluation values, the calculated evaluation values of pixels are sorted, and the distribution order of dots are determined.

The output value determination unit 205 allocates 1 to output values of pixels in the distribution order determined by the distribution order determination unit until the target value (sum of output values) calculated by the target value calculation unit 202 is reached, and the output values of pixels in the subject region are determined.

The distribution order of dots in the subject region determined by the distribution order determination unit 203 will be described below. Generally, in order to perform a dither process on a threshold value matrix, each pixel value is quantized by being compared with each positionally corresponding threshold value, and output values thereof are determined. A region 402 illustrated in FIG. 4 has pixels uniformly having pixel values "10" within a subject region in input image data, for example. A region 404 illustrated in FIG. 4 has pixels uniformly having pixel values "150". Pixels of the region 402 and 404 and threshold values corresponding to the threshold value matrix 401 are compared. The pixels having pixel values higher than the threshold values are processed to have an output value 1 (ON dot), and pixels having pixel values equal to or lower than the threshold values are processed to have an output value 0 (OFF dot). As a result, the region 402 is converted to an output result 403, and the region 404 is converted to an output result 405. The output results 403 and 405 have black rectangles each indicating a pixel having an ON dot and white rectangles each indicating a pixel having an OFF dot.

From the output results 403 and 405, it is understood that the subject region in the input image data has an increased number of dots as pixel values (density) increase. Particularly, the threshold value matrix 401 has threshold values of a plurality of different values dispersed from increasing order (so the threshold values are not simply positioned in increasing order). Thus, dots acquired as a result of the dither process may disperse as much as possible for higher granularity. Such arrangement of the threshold values allows control of granularity of dots. In other words, the threshold value matrix may control the order of arrangement of dots based on the arrangement of the threshold values. Generally, threshold values in a threshold value matrix are generally designed in consideration of an output characteristic of the image formation unit 107. According to this exemplary embodiment, a threshold value matrix to be used generally for a dither process is handled as information describing the arrangement order of dots for controlling a dot pattern in accordance with an output characteristic of the image formation unit 107.

Here, in a case where a plurality of pixels within a subject region in input image data do not have a uniform pixel value, fluctuations in pixel value in the subject region and fluctuations in threshold value in the threshold value matrix may interfere with each other, and a desired output result may not be acquired. For example, in a case that a pixel has a higher pixel value than those of surrounding pixels, the pixel has more possibility to be converted to output value 1 indicating a dot than the surrounding pixels. However, for correspondence with a threshold value higher than other threshold values in a threshold value matrix, a pixel having a higher pixel value than those of surrounding pixels may sometimes be converted to an output value 0. As a result, a resolution of input image data or a characteristic exhibited by an image may be lost. Particularly, a degradation in such an output result may be significant in pixels representing a fine line or an edge.

Accordingly, the distribution order determination unit 203 of the first exemplary embodiment calculates a difference between a pixel value of each pixel and a threshold value as an evaluation value. In a unit region, a higher evaluation value is calculated for a pixel having a higher value acquired by subtracting a threshold value from a corresponding pixel value. Distributing dots in order of sorting the evaluation values allows determination of output values of the dots in a subject region which reflects both of a characteristic of the input image data and a characteristic of the threshold value matrix.

Operations in Image Processing Unit 106

Figure 5:
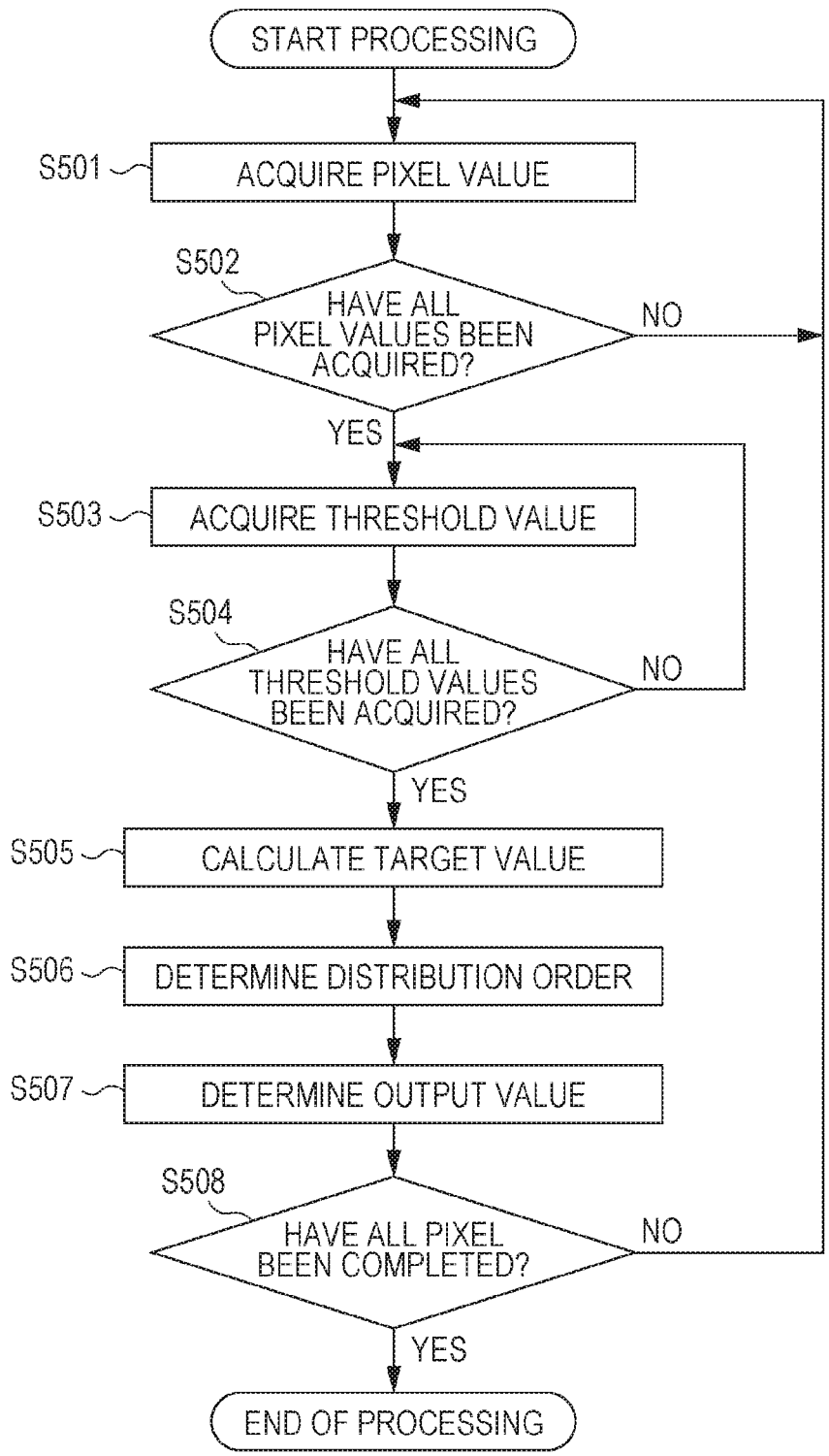
FIG. 5 illustrates operations to be performed by the image processing unit.

FIG. 5 illustrates operations of processing in the image processing unit 106. FIG. 4 further illustrates processing results 406 to 409 acquired by the following processing.

The pixel value acquisition unit 201 in step S501 acquires pixel values of a plurality of pixels included in a subject region of input image data from the RAM 101 or external storage device 105. It is assumed here, for example, that the region 406 is acquired as pixel values of pixels as a subject region. When one pixel value is acquired, the pixel value acquisition unit 201 in step S502 determines whether pixel values of all pixels included in the subject region have been acquired or not. If pixel values of all pixels included in the subject region have not been acquired, the processing returns to step S501, and the pixel value acquisition is repeated. If pixel values of all pixels included in the subject region have been acquired, the processing moves to step S503.

The threshold value acquisition unit 204 in step S503 acquires threshold values of a threshold value matrix corresponding to the subject region from the RAM 101 or external storage device 105. In this case, the threshold values of the threshold value matrix 401 are acquired. The threshold value acquisition unit 204 in step S504 determines whether all threshold values corresponding to the subject region have been acquired or not. If not, the processing returns to step S503 where threshold values are sequentially acquired. If all threshold values corresponding to the subject region have been acquired, the processing moves to step S505. Because the processing in step S501 and step S502 and the processing in step S503 and step S504 are not dependent on each other, any one of these steps may be executed first in a case where these steps are executed sequentially, or both of the steps may be executed in parallel.

The target value calculation unit 202 in step S505 calculates a target value (sum of target output values) in the subject region based on the pixel values acquired in step S501 and step S502. Here, the quotient is calculated by dividing a sum of all pixel values within the subject region by 255. The resulting quotient represents the number of pixels having dots which should be turned on in the subject region. In the case of the region 406, a sum of pixel values of pixels therein is equal to 1132. Because the quotient acquired by dividing 1132 by 255 is 4.43 . . . , a value of 4 as the number of pixels of having dots to be turned on is calculated as a target value in the region 406.

In step S506, the distribution order determination unit 203 calculates a value acquired by subtracting a threshold value from a corresponding pixel value for each pixel of the subject region as an evaluation value. According to this exemplary embodiment, because the subject region includes 16 pixels, evaluation values are calculated for 16 pixels. Based on the region 406 and the threshold value matrix 401, an evaluation value group 407 corresponding to the region 406 is calculated. The distribution order determination unit 203 further determines the result of sorting the calculated evaluation values in decreasing order as a distribution order (in particular, the evaluation values making up the evaluation value group are numbered in decreasing order with the highest evaluation value being numbered 1 and the lowest evaluation value being numbered 16, as shown in 408). In other words, dots are distributed in order from a pixel having a highest evaluation value in the subject region. In the case of the region 406, a distribution order 408 is determined based on the evaluation value group 407.

The output value determination unit 205 in step S507 determines positions of pixels equal to the number of pixel having dots to be turned on in the subject region acquired in step S505 in the distribution order and sets 1 as output values of the pixel at the positions in the determined order. The output values of the other pixels are set to 0 as pixels each having a dot to be turned off. The output values of the pixels in the region 406 are determined as illustrated in the output result 409. So, in the present example, the target value of 4 was obtained in S505 so the pixels numbered 1 to 4 inclusive are set to 1 as shown in 409.

In step S508, whether the processing on all of the unit region has ended or not is determined. If not, the processing is repeated. In step S506, because the processing may be performed by acquiring the pixel values of a plurality of pixels included in a subject region in input image data, step S506 may be performed while the processing in step S501 to step S505 is being performed.

In the half-tone image data acquired by this processing, the output value 1 (ON dot) is more easily allocated as the difference between the pixel value included in the input image data and the maximum value "255" decreases or as the difference between the corresponding threshold value and the minimum value "0" decreases. In a case where a unit region represents a flat image, that is, where a small fluctuation exists in pixel values of a plurality of pixels, dots are disposed in increasing order of threshold values. Thus, the image is converted to half-tone image data representing the dot arrangement reflecting a designed intention. In a case where a unit region has a characteristic of a fine line or an edge, for example, the magnitudes of pixel values are reflected to (in) the dot arrangement order. The image is converted to half-tone image data keeping a characteristic of the image, compared with the method using a threshold value matrix to quantize by simply performing a dither process. Therefore, according to this exemplary embodiment, input image data may be converted to half-tone image data with higher image quality.

According to the first exemplary embodiment, the target value calculation unit 202 adds the pixel values of a plurality of pixels included in a subject region and divides the sum by 255 corresponding to the pixel value represented by an ON dot to calculate the number of pixels having dot to be turned on in the subject region. However, in a case where a cell matched with the size of a threshold value matrix is a unit region in input image data, the total number of dots acquired as a result of a dither process is equal if pixel values in the subject region are uniform. Therefore, for example, the target value calculation unit 202 may average pixel values of pixels in a unit region to acquire an average value of pixel values of all pixels in unit region. Then, the number of dots corresponding to the average value may be calculated as a target value.

For convenience of description, a threshold value matrix according to the first exemplary embodiment is a threshold value matrix to be used for a dither process. However, it should be noted that a threshold value matrix is not used as threshold values to be compared with pixel value of pixel in input image data as in a dither process in the past. According to the first exemplary embodiment, a plurality of values having an equal range (0 to 255 here) to the range of input image data for a desired dot pattern are arranged properly so that a threshold value matrix may be used as information describing the order of pixels within a predetermined region.

Figure 6:
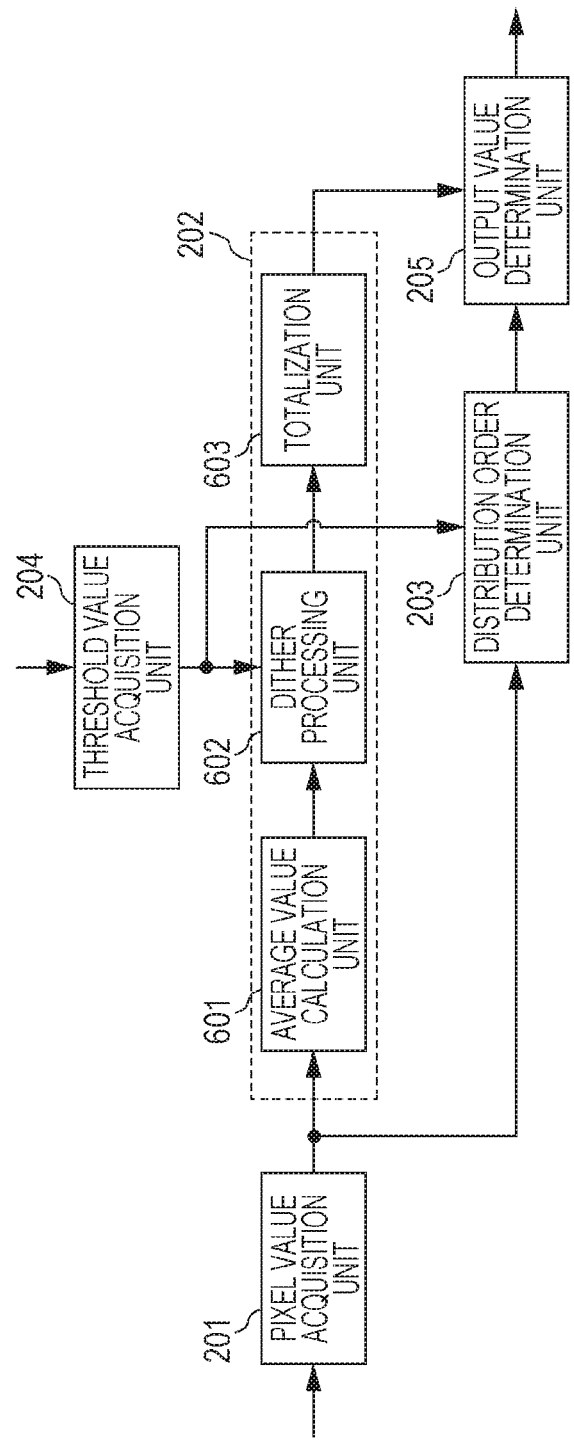
FIG. 6 is a block diagram illustrating a configuration of the image processing unit.

According to the first exemplary embodiment, a half-tone (binarize) process has been described as an example which converts input image data to half-tone image data having 0 or 1. A value acquired by subtracting a threshold value from a pixel value is used as an evaluation value. According to a second exemplary embodiment, input image data of 8 bits for 1 pixel is ternarized, for example. A method for calculating an evaluation value in accordance with a characteristic of an image will be described. Notably, like numbers refer to like parts to those of the first exemplary embodiment, and the detailed description thereof will be omitted. FIG. 6 illustrates a detail configuration of the image processing unit 106 according to the second exemplary embodiment. The target value calculation unit 202 has an average value calculation unit 601, a dither processing unit 602, and a totalization unit 603.

The average value calculation unit 601 averages pixel values of all pixels included in a subject region (e.g. by calculating the mean pixel value) and acquires an average value in the subject region. The average value calculation unit 601 output the calculated average value to the dither processing unit 602.

Figure 7:
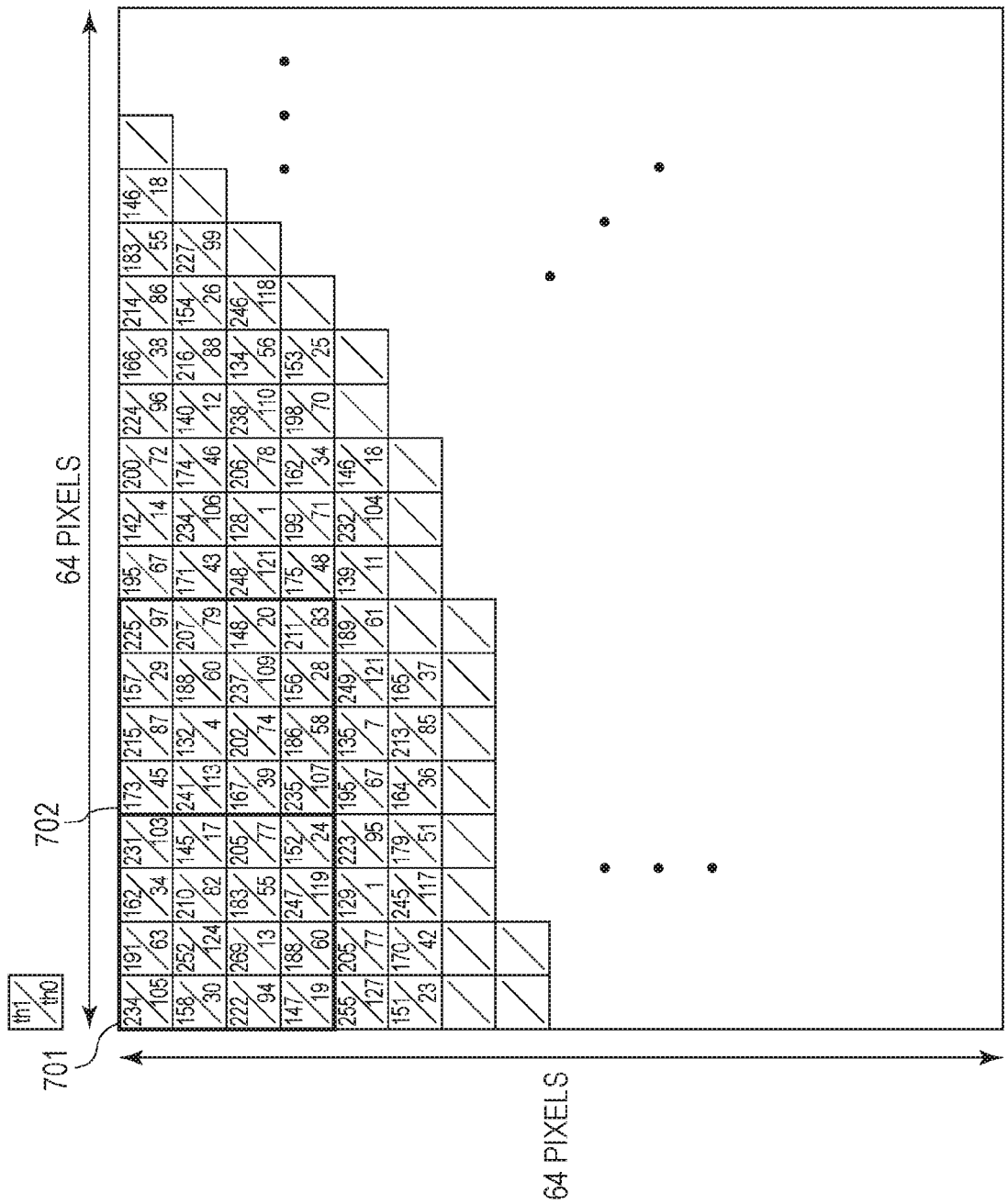
FIG. 7 illustrates an example of a threshold value matrix having a blue-noise characteristic.

The dither processing unit 602 acquires threshold values corresponding to the subject region from the threshold value acquisition unit 204. According to the second exemplary embodiment, a 64×64 pixel threshold value matrix is used as illustrated in FIG. 7. However, a unit region to be processed is a 4×4 pixel region, like the first exemplary embodiment. Thus, every time a subject region is updated, the threshold value acquisition unit 204 acquires threshold values at positions corresponding to the 4×4 pixel region sequentially from the threshold value matrix illustrated in FIG. 7. The threshold value matrix illustrated in FIG. 7 is a threshold value matrix (hereinafter called a blue-noise mask) having what-is-called a blue-noise characteristic. It is known that a dot pattern with high disparity is acquired when a dither process using a blue-noise mask is executed. Such a blue-noise mask is generally suitable for halftoning for an ink-jet image formation unit 107.

The blue-noise mask according to the second exemplary embodiment has two threshold values for each pixel position. Therefore, the 4×4 pixel unit region has 32 threshold values. Each threshold value is represented by an 8-bit value in accordance with tones of input image data. By changing the number of tones for the threshold value subject to a dither process, the dither process may be executed on N-value input image data. By changing the number of threshold values for each pixel, the dither process may be executed on M value input image data.

The dither processing unit 602 performs a dither process with the threshold value group acquired by the threshold value acquisition unit 204 on the average value in the subject region output from the average value calculation unit 601. According to this exemplary embodiment, the dither process includes ternarization, the output value of each pixel output from the dither processing unit 602 is one of values 0, 1, and 2.

The totalization unit 603 totalizes (totals) the results of the dither processes performed by the dither processing unit 602. The totalization unit 603 outputs the totalization result as a target value in the subject region to the output value determination unit 205.

The distribution order determination unit 203 calculates an evaluation value for each pixel in the subject region based on the pixel value thereof and the threshold value, and the evaluation values in the subject region are sorted so that a distribution order is determined which is order of pixels providing higher output values by priority. The distribution order determination unit 203 outputs the determined distribution order to the output value determination unit 205.

The output value determination unit 205 allocates 1 to output values of pixels in the order determined by the distribution order determination unit 203 until the target value acquired by the totalization unit 603 is reached, and the output values of the pixels in the subject region are determined.

Descriptions of Operations to be Performed by Image Processing Unit 106

Figure 9:
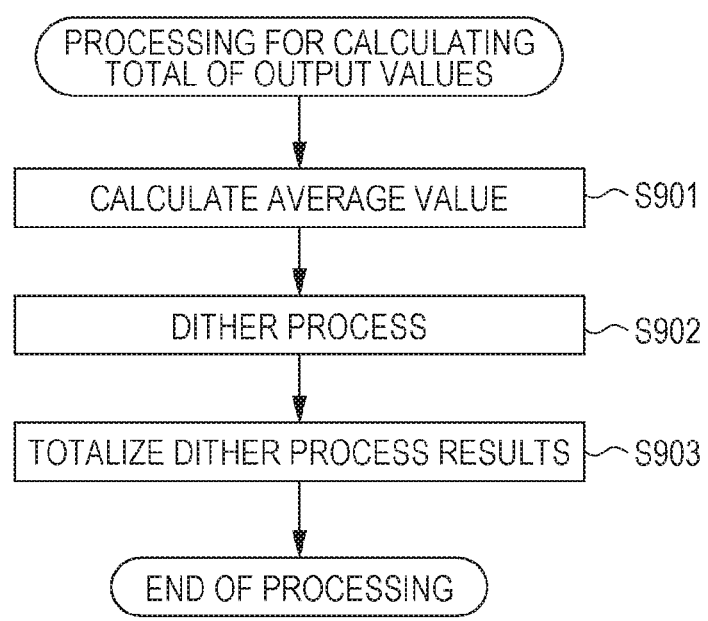
FIG. 9 illustrates operations to be performed by the target value calculation unit.

Operations to be performed by the image processing unit 106 according to the second exemplary embodiment are different from the first exemplary embodiment as in the flowchart in FIG. 5 in the target value calculation process in step S505, distribution order determination process in step S506, and output value determination process in step S507. First, details of the target value calculation process in step S505 will be described with reference to a flowchart illustrated in FIG. 9.

Figure 8:
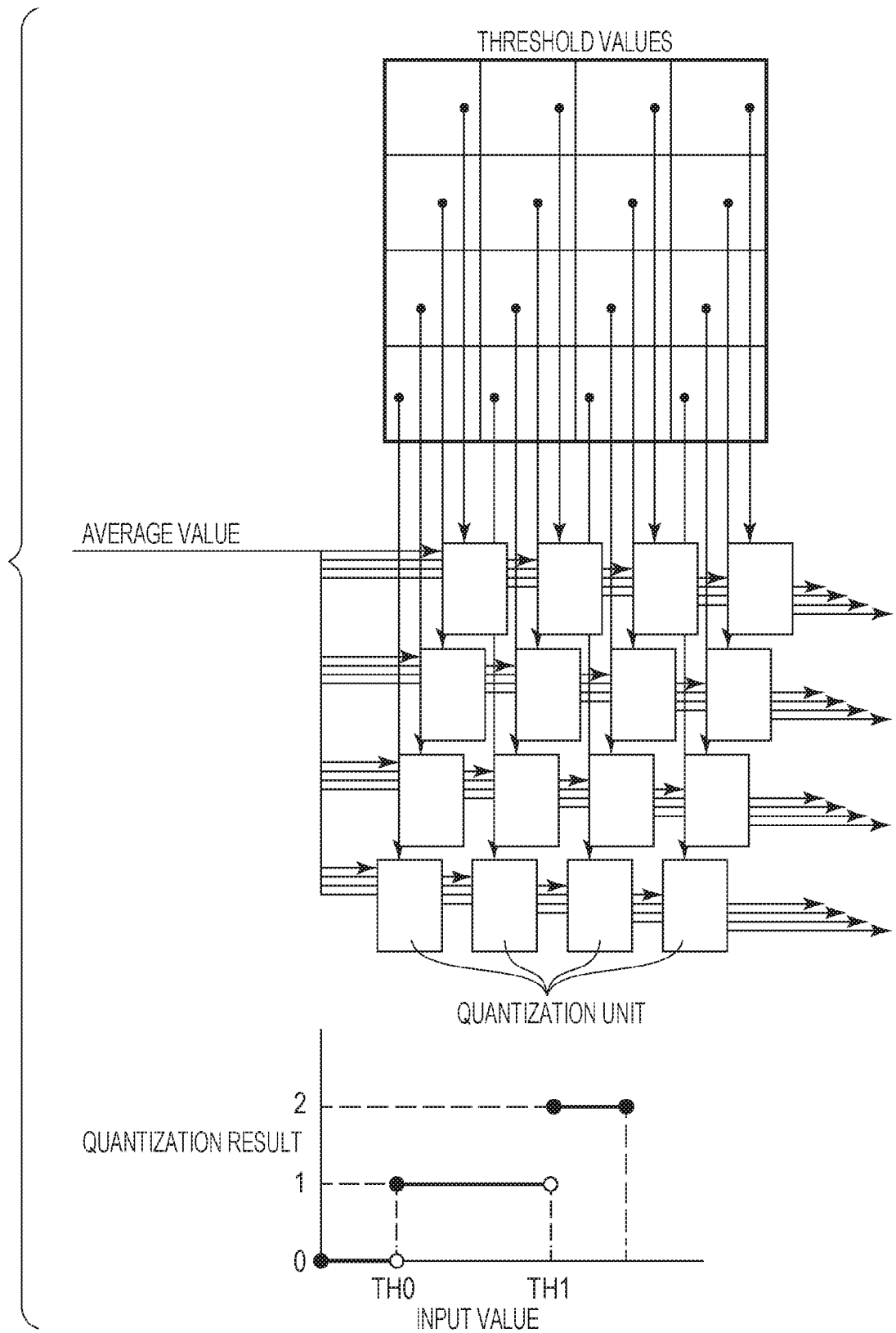
FIG. 8 illustrates a target value calculation unit.

The average value calculation unit 601 in step S901 calculates an average value of pixel values of pixels included in a unit region to be processed. The calculated average value is used for performing a dither process with the threshold value group acquired by the dither processing unit 602 in step S902. FIG. 8 illustrates a dither process according to this exemplary embodiment. The average value and each threshold value are compared in a quantization unit provided for each pixel to quantize (or ternarize here). For one average value calculated in step S901, 16 threshold value groups corresponding to 4×4 pixels are acquired. The dither process according to this exemplary embodiment outputs a result of comparison between one average value and each of threshold values of the threshold value group as a quantization result of pixels. This corresponds to the dither process performed after substituting pixel values of pixels in the subject region by the average value. In step S902, the quantization results output from the quantization units are output to the totalization unit 603 in the subsequent stage.

Next, in step S903, the totalization unit 603 totalizes the results of the dither process in step S902. As a result of the dither process in step S902, one of quantized values 0, 1, and 2 is acquired for each pixel. Then, the totalization unit 603 calculates a sum total of quantized values of 4×4 pixels in the subject region. The sum total of the dither processing results in the unit region is matched with the sum total of final output values for each processing unit and is set as a target value when an output value is allocated to each if pixels in step S3507 in the subsequent stage. After this processing, the target value calculation process in step S505 completes.

Figure 10:
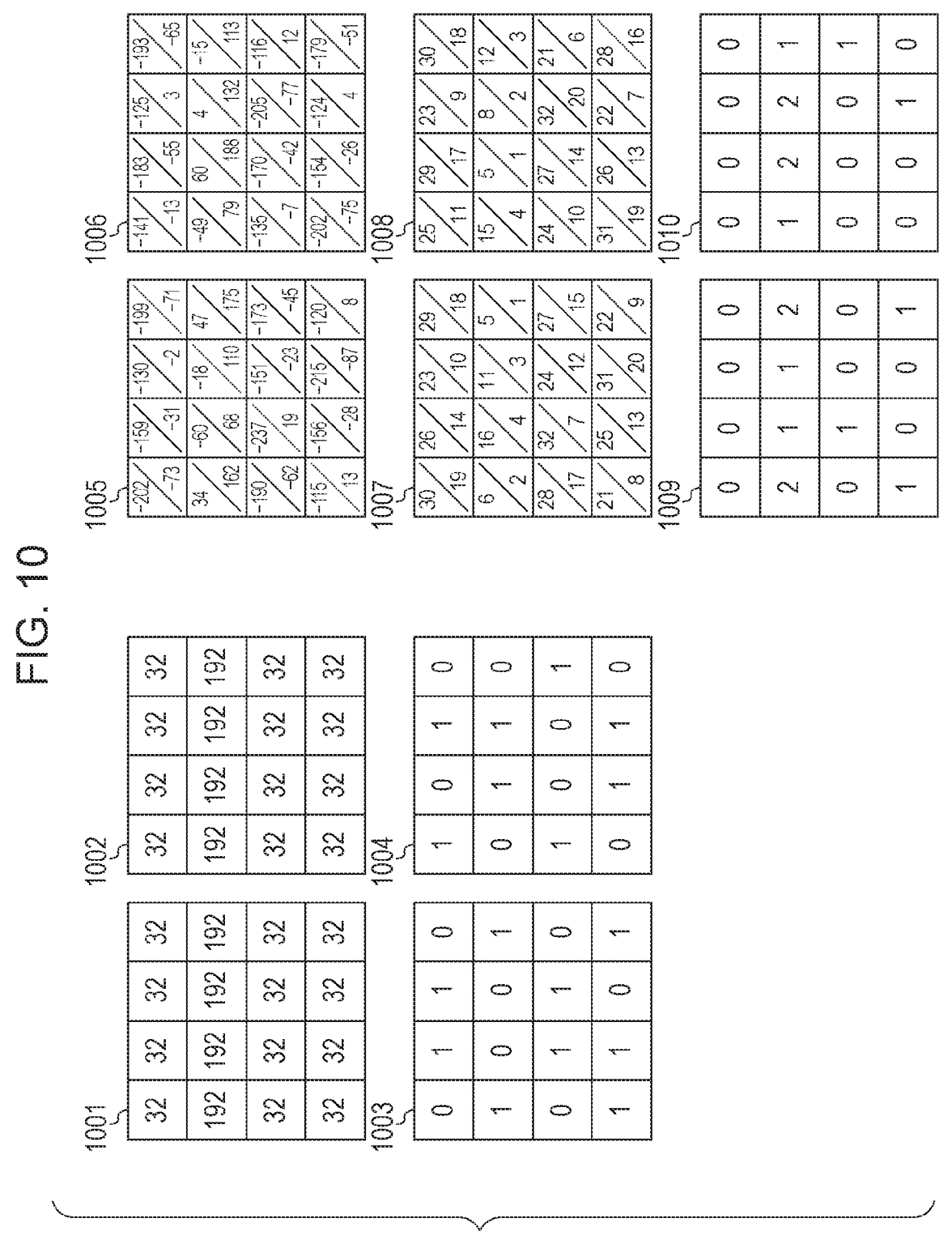

As in the second exemplary embodiment, in a case where a partial local region of a threshold value matrix is a size of a unit region, the sum total of output values acquired as a result of the dither process may vary in accordance with the position in the threshold value matrix corresponding to the subject region even with respect to an identical average value of the subject region. For example, the region 1001 and region 1002 illustrated in FIG. 10 represent pixel groups including pixels within the regions having an identical pixel value. In both of the region 1001 and 1002, the average value of the pixel values is equal to 72. Performing the dither process with a threshold value group 701 and a threshold value group 702 within a threshold value matrix illustrated in FIG. 7 on the pixel group in which the pixel values of the pixels within the regions are substituted by an average value of 72 results in a dither processing result 1003 and a dither processing result 1004. Acquiring the sum total of output values in each of the dither processing result 1003 and dither processing result 1004, the sum of output values (target value) is equal to 9 in the dither processing result 1003, and the sum of output values (target value) in the dither processing result 1004 is equal to 8. Such variations in target value caused even with an identical average value of pixel groups depends on the threshold value array defined when the threshold value matrix is designed and are caused for improving tonality and granularity of the dot pattern resulting from a dither process. Therefore, in a case where the size of a local region of a threshold value matrix is equal to the size of a unit region of input image data, it is important for calculating a target value for each of threshold value groups included in each local region.

Next, the distribution order determination process in step 506 according to the second exemplary embodiment will be described. In order to determine the distribution order of output values, the distribution order determination unit 203 (FIG. 6) in the second exemplary embodiment uses, as an evaluation value, "input pixel value−α×threshold value" (where α is equal to or higher than 0) acquired as a result of subtraction of a value acquired by multiplying a corresponding threshold value by the coefficient α from the pixel value. The distribution order determination unit 203 sorts the calculated evaluation values and determines the distribution order that is decreasing order from a pixel with a higher evaluation value to a pixel with a lower evaluation value. In other words, this exemplary embodiment is different from the first exemplary embodiment in that the coefficient α is used.

If the coefficient α in "input pixel value−α×threshold value" that is an evaluation value is equal to 0, the distribution order is determined only dependent on the pattern of pixel values included in the input image. The more the difference between the coefficient α and 0 increases, the more the arrangement of the threshold values in the threshold value matrix is reflected to (in) the evaluation value. In other words, a pixel corresponding to a lower threshold value, of a threshold value group corresponding to a subject region, is distributed a dot by priority (earlier distribution order). If the coefficient α is higher than 0 and the pixel values in the input image data are fixed, the distribution order is determined dependent on the magnitudes of the threshold values. Therefore, pixels having dots to be turned on in the region are determined in order based on a characteristic of a designed threshold value matrix. As the coefficient α increases, the strength of the influence of the distribution order determined based on the threshold value matrix increases. When the coefficient α is set to a value higher than 1, the arrangement of threshold values has a higher influence on evaluation values than a pattern of pixel values in input image data. Use of such evaluation values allows adjustment of the influence of a pattern (characteristic) of input image data on the evaluation values and the influence of the arrangement of threshold values in a threshold value matrix on the evaluation values.

For example, in a case where input image data represent an edge or a fine line, giving priority to a pattern of pixel values in the input image data produces high reproducibility of the edge or fine line in a quantized result, independent of a characteristic of a threshold value matrix. Therefore, in a case where input image data (or unit region) represent an edge or a fine line, the coefficient α in "input pixel value−α×threshold value" may be lower than 1. On the other hand, for input image data of a natural picture or having many flat parts, the coefficient α may be set to a value equal to or higher than 1 such that the distribution order may be determined in accordance with a characteristic (or blue-noise characteristic according to this exemplary embodiment) of a threshold value matrix designed in advance for emphasizing granularity more than others. If α=1, the evaluation values are calculated in the same manner as that in the first exemplary embodiment.

As described above, image quality of an output image may be adjusted by changing the coefficient α in accordance with a characteristic (such as an amount of edge and an amount of contrast) and attribute data (such as an edge and a fine line) of an entire processing unit region or image and type and content information (such as a natural picture, character/line drawing, and a drawing) of the image. The coefficient α may be set for each input image data or for each region in input image data. According to this exemplary embodiment, content information of image data is read. If the input image data is a natural picture, coefficient α is set to 1. If the input image data is a drawing or a character/line drawing, the coefficient α is set to 0.5. After input image data are acquired, the distribution order determination unit 203 sets the coefficient α to 1 or 0.5 based on the content information of the input image data. Then, for each of pixels included in a subject region, "input pixel value−α×threshold value" being an evaluation value is calculated, and the calculated evaluation values are sorted.

The sorting process will be described in a case where a threshold value matrix corresponding to two threshold values is used for each pixel illustrated in FIG. 7. Steps of the distribution order determination process where α=1 will be described with reference to evaluation value groups 1005 to 1010 in FIG. 10. The evaluation value group 1005 is a result of calculation of the evaluation value "input pixel value−α×threshold value" for each threshold value based on a threshold value group 701 (FIG. 7) corresponding to the region 1001 illustrated in FIG. 10. The evaluation value group 1006 is a result of calculation of the evaluation value based on a threshold value group 702 (FIG. 7) corresponding to a region 1002. From the evaluation value groups 1005 and 1006, it is understood that evaluation values for threshold values with respect to each pixel is calculated and that each pixel has two kinds of evaluation value in the results of the evaluation value calculation. The evaluation value groups 1005 and 1006 are further sorted, and allocation of a distribution order which is a decreasing order from a high evaluation value to a low evaluation value distribution order results in evaluation value groups 1007 and 1008. For pixels with equal evaluation values, a pixel corresponding to a lower threshold value is given priority in the distribution order. According to this exemplary embodiment, two threshold values correspond to each pixel for ternarization. Therefore, the distribution order is determined for a region of 4×4 pixels or 16 pixels, the distribution order from 1 to 32 is determined.

Next, the output value determination process in step S507 will be described. The output value determination unit 205 (FIG. 6) allocates 1 to an output value of each pixel based on the distribution order of the subject region received from the distribution order determination unit 203 so as to acquire the target value of the subject region acquired from the totalization unit 603. The count value of an output value of each pixel in the subject region is set to an initial value 0, and each count value is incremented by 1 sequentially every time the output value "1" is distributed until the target value is acquired. It is assumed here, for example, that a target value 9 calculated by the totalization unit 603 is allocated to the distribution order 1007. The count value is incremented by 1 every time the output value "1" is distributed sequentially from the pixel at the first place of the distribution order. When the target value 9 is reached, the distribution of the output value completes.

The output value of a pixel to which the output value 1 is allocated twice is determined as 2. The output value of a pixel to which the output value 1 is allocated once is determined as 1. The output value of a pixel to which the output value 1 is not allocated is determined as 0. Then, the output values of the pixels of the subject region as in an output result 1009 in FIG. 10. By performing the processing above, input image data having a pixel value of one of 0 to 255 is converted to output image data represented by one of three values of 0, 1, and 2. The subject region is processed in blocks of 4×4 pixels smaller than the threshold value matrix (such as 64×64 pixels). The evaluation value calculation above applies the coefficient α which allows proper control of an influence caused by a characteristic of input image data and an influence caused by a characteristic of a threshold value matrix. As a result, input image data may be quantized adjustably, which may prevent the interference between the characteristic of input image data and the characteristic of a threshold value matrix.

According to the second exemplary embodiment, distribution order is allocated to numbers of threshold values instead of distribution order to pixels. However, even in a case where the ternarization is performed, one place of distribution order may be allocated to each pixel as in the first exemplary embodiment. For example, after an evaluation value is calculated for each threshold value, one evaluation value representative of a pixel is determined. More specifically, a higher evaluation value of a plurality of evaluation values corresponding to a pixel may be determined as a representative value. This allows allocation of one distribution order place to each pixel. In this case, the output value 1 is allocated to pixels sequentially in the distribution order, and after allocation to all of the pixels, the output value 1 may further be added to each of the pixels. Alternatively, an output value 2 may be allocated in the distribution order. When only 1 remains with respect to the target value finally, the output value 1 may be allocated to the pixel.

In a case where a pixel value in input image data is 0 (minimum value of a pixel value range in input image data), the output value is 0 in dither processing results by comparing any threshold value. In a case where a pixel value in input image data is 255 (maximum value of a pixel value range in input image data), the output value is a maximum value in dither processing results by comparing any threshold value. Accordingly, the order places determined based on evaluation values may be ignored for a pixel having a minimum pixel value or maximum pixel value in input image data. In that case, for example, the place of a pixel having a minimum pixel value may be changed always to the last in the distribution order, or such a pixel may be excluded from the distribution.

According to the first exemplary embodiment, "input pixel value–threshold value" is an example of the evaluation value. According to the second exemplary embodiment, "input pixel value–α×threshold value" is an example of the evaluation value. Such an evaluation value may be calculated easily and in consideration of both of a pixel value and a threshold value particularly in a case where a hardware circuit is implemented as one of those embodiments. However, a function for deriving an evaluation value is not limited thereto. Particularly in a case where the second exemplary embodiment is implemented by a software process, an evaluation value for each pixel may be derived by using an evaluation function combining a function dependent on a pixel value and a function dependent on a threshold value, instead of a simple difference. In this case, the function dependent on a pixel value may be a monotonically increasing function with respect to pixel values, while the function dependent on a threshold value may be a monotonically decreasing function with respect to threshold values so that the same effect as that of the aforementioned exemplary embodiments may be acquired.

According to a third exemplary embodiment, a distribution order determination process to be executed by the distribution order determination unit 203 is implemented by a simpler hardware configuration. According to this exemplary embodiment, an output density is adjustable by a γ correction function based on characteristics of the image formation unit 107 and display unit 104. The same configuration as the configuration of any of the exemplary embodiments may be implemented in this embodiment, and the description will be omitted.

Configuration of Image Processing Unit 106

Figure 11:
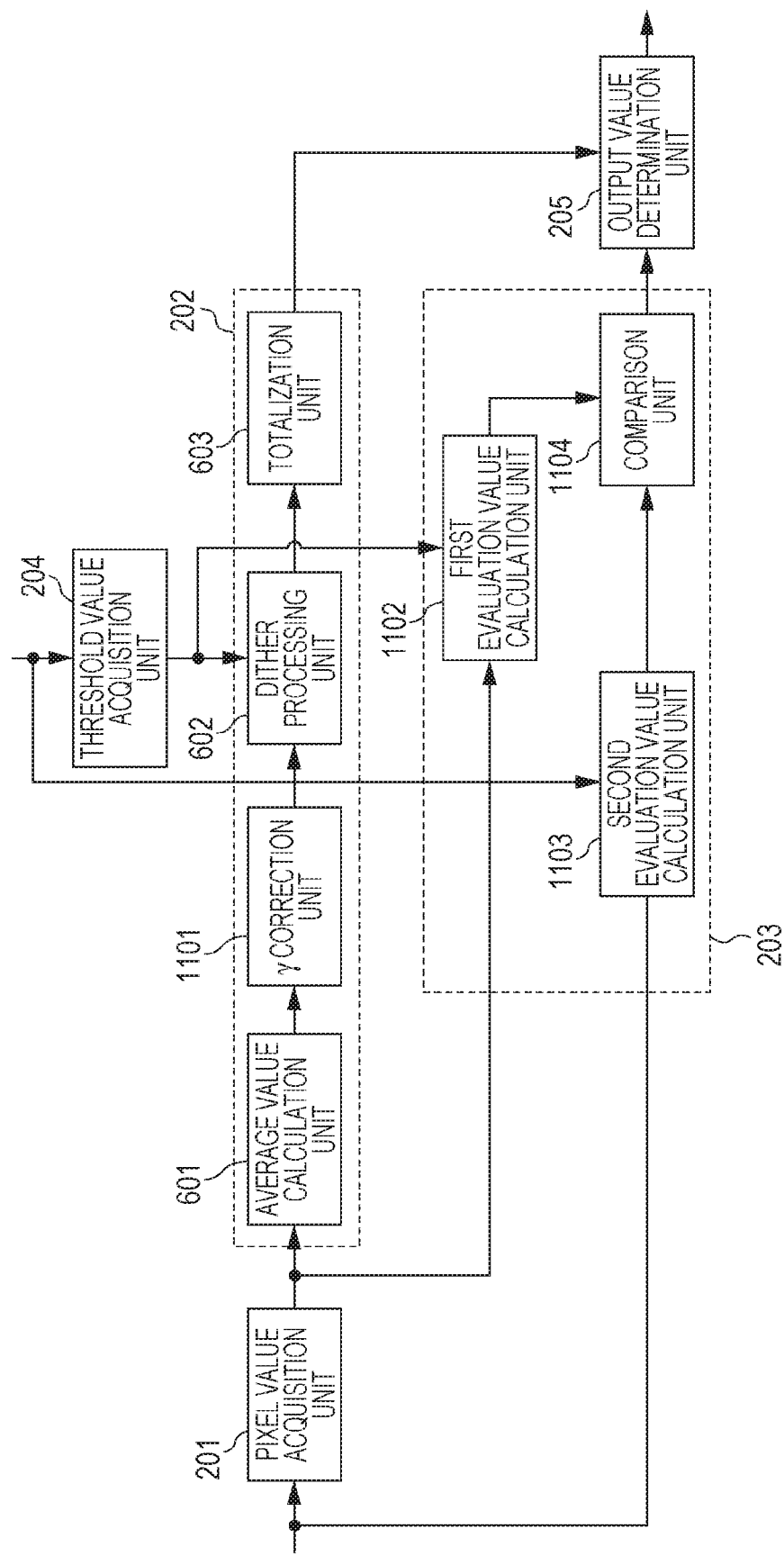
FIG. 11 is a block diagram illustrating a configuration of the image processing unit.

FIG. 11 is a block diagram illustrating a configuration example of the image processing unit 106 according to the third exemplary embodiment. The image processing unit 106 according to the third exemplary embodiment is different from the image processing unit 106 according to any one of the aforementioned exemplary embodiments in detailed configurations of the target value calculation unit 202 and detailed configurations of the distribution order determination unit 203. The target value calculation unit 202 according to the third exemplary embodiment has an average value calculation unit 601, a γ correction unit 1101, a dither processing unit 602, and a totalization unit 603. In other words, according to the third exemplary embodiment, after the average value calculation unit 601 replaces pixel values of pixels by an average value, a process is performed by the γ correction unit 1101. According to this exemplary embodiment, the γ correction unit 1101 executes a γ correction process in accordance with an output characteristic of the image formation unit 107.

The distribution order determination unit 203 according to the third exemplary embodiment has a first evaluation value calculation unit 1102, a second evaluation value calculation unit 1103, and a comparison unit 1104.

The first evaluation value calculation unit 1102 calculates an evaluation value for each pixel included in a subject region. The second evaluation value calculation unit 1103 calculates and outputs an evaluation value for each pixel of interest in the subject region. The second evaluation value calculation unit 1103 calculates an evaluation value in accordance with a same evaluation function as that of the first evaluation value calculation unit 1102. In other words, while the first evaluation value calculation unit 1102 outputs evaluation values for the entire subject region, the second evaluation value calculation unit 1103 only outputs an evaluation value for a pixel of interest.

The comparison unit 1104 compares an evaluation value for the pixel of interest output from the second evaluation value calculation unit 1103 with evaluation values for all pixels in the subject region including the pixel of interest output from the first evaluation value calculation unit 1102. Based on the comparison results, how the size of the evaluation value corresponding to the pixel of interest ranks, that is, the place in the distribution order is determined.

Operations in Image Processing Unit 106

The operations in the image processing unit 106 according to the third exemplary embodiment illustrated in FIG. 11 are different from the flowchart illustrated in FIG. 5 according to the second exemplary embodiment in the target value calculation process in step S505 and the distribution order determination process in step S506.

Figure 15:
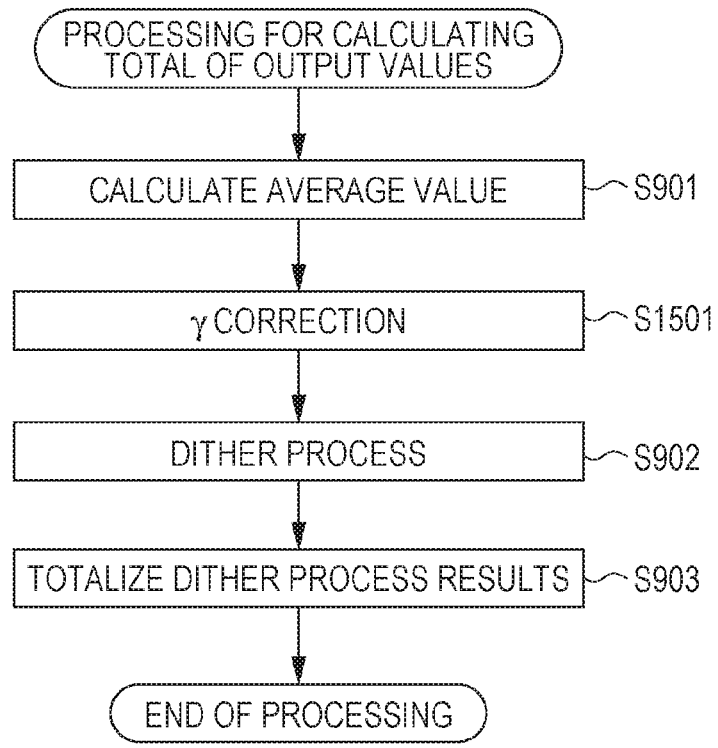
FIG. 15 illustrates operations to be performed by the target value calculation unit.

First, the target value calculation process in step S505 will be described with reference to FIG. 15. In step S901, the average value calculation unit 601 averages the pixel values of pixels included in a subject region to acquire an average value. The pixel values of pixels included in the subject region are replaced by the calculated average value, and the pixel values in the subject region are output.

Figure 12:
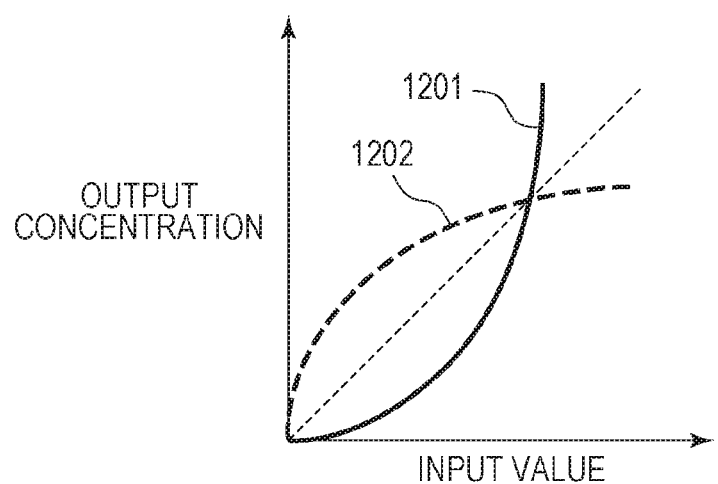
FIG. 12 illustrates a γ correction.

In step S1501, the γ correction unit 210 performs a γ correction on pixels in the subject region. Image data output from the image processing unit 106 are usable by a user through an output device (image formation unit 107 or display unit 104). In this case, the output density of even identical image data varies in accordance with a characteristic of the output device. Accordingly, a γ correction is performed so that the output densities of output devices may be matched. The γ correction corrects an input value with a correction curve 1201 having a reverse characteristic of an input/output characteristic 1202 of the output device as illustrated in FIG. 12. This γ correction results in a linear output density characteristic.

The input/output characteristic of an output device is a non-linear characteristic under strong influences between pixels. Particularly, such a non-linear characteristic may be acquired easily under an influence of a dot gain generated when image data are output from an ink-jet printer. Therefore, performing a γ correction after the averaging in a predetermined region allows accurate correction of the output density rather than performing the averaging after performing a γ correction on each of pixels. The number of γ corrections is greatly reduced by performing a γ correction after performing the averaging in a predetermined region (reduced to ¹⁄₁₆ when the predetermined region has 4×4 pixels).

In the subsequent step S902 and step S903, the same processes as those of the second exemplary embodiment are executed. By executing the γ correction process, a target value (a sum of output values) may be calculated in accordance with a characteristic of an output device.

Figure 16:
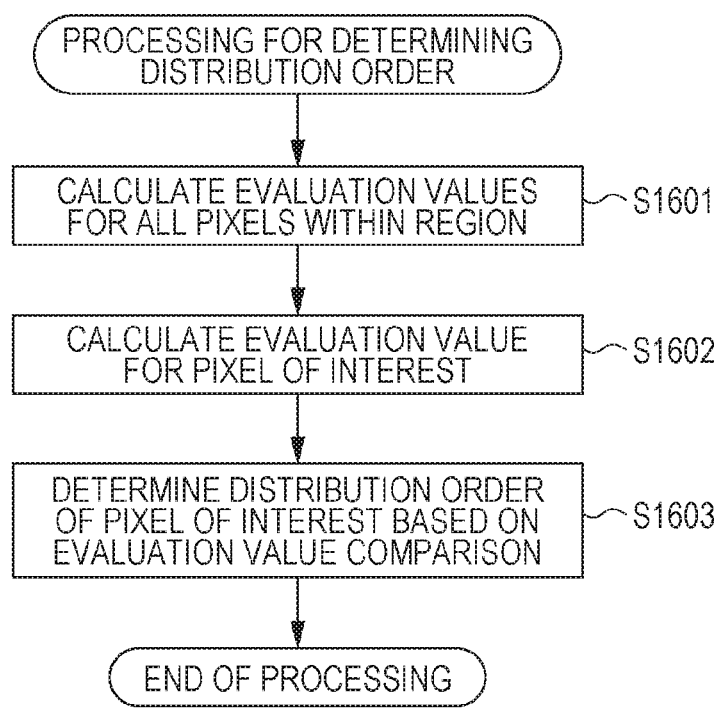
FIG. 16 illustrates operations to be performed by the distribution order determination unit.

Next, the distribution order determination process in step S506 will be described. FIG. 16 illustrates detail operations to be performed by the distribution order determination unit 203 according to the third exemplary embodiment.

Figure 13:
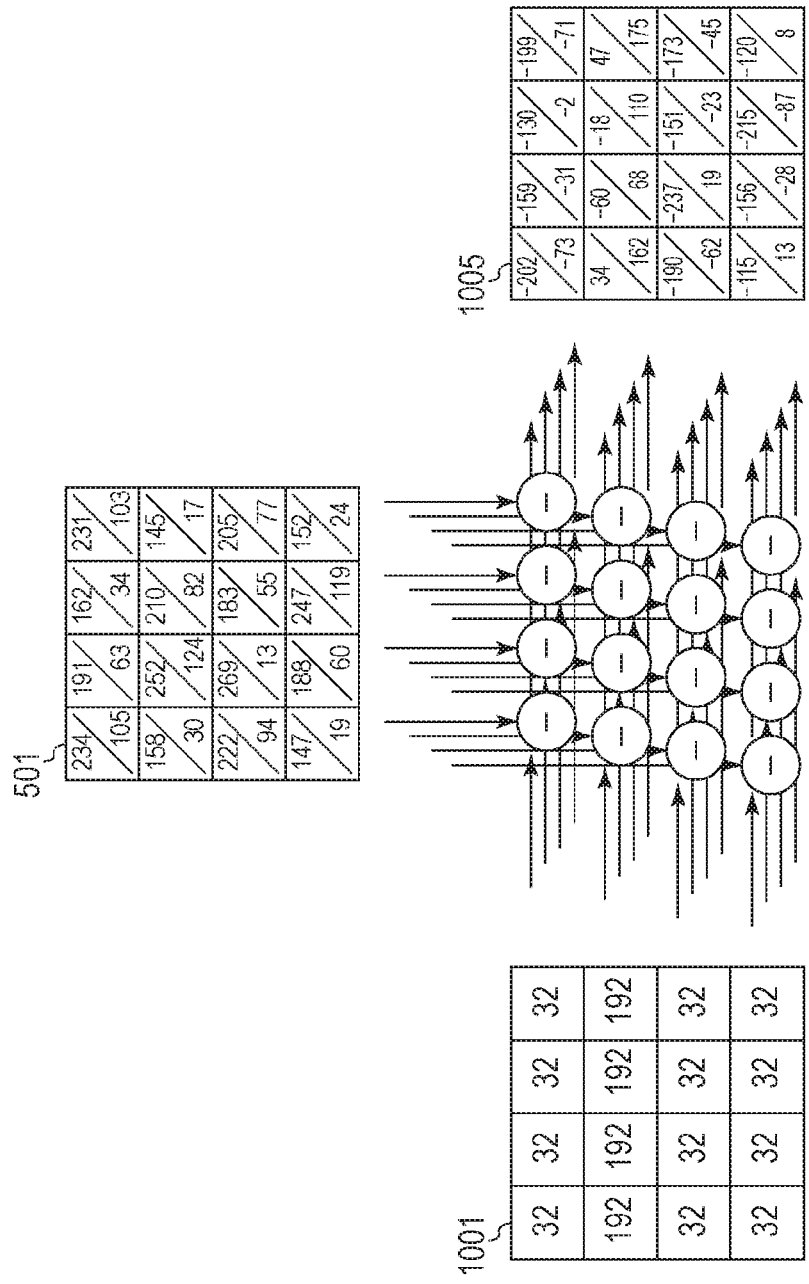
FIG. 13 illustrates first evaluation value calculation unit.

The first evaluation value calculation unit 1102 in step S1601 calculates and outputs evaluation values for all pixels in a subject region. FIG. 13 illustrates a configuration in the first evaluation value calculation unit 1102. The threshold value group 701 illustrated in FIG. 7 corresponding to the same subject region 1001 as that in FIG. 10 is used to output an evaluation value group 1005 based on a difference between pixel values of pixels and threshold values thereof. Each of the evaluation values corresponds to "pixel value− α×threshold value" where α=1, for example, according to the second exemplary embodiment. The process in step S1601 is performed on unit region by unit region, and subsequent processes are performed on pixel by pixel in a subject region.

The second evaluation value calculation unit 1103 in step S1602 calculates an evaluation value for a pixel of interest in the subject region. In step S1601, an evaluation value is calculated based on "pixel value−α×threshold value" where α=1, like the first evaluation value calculation unit 1102.

Figure 14:
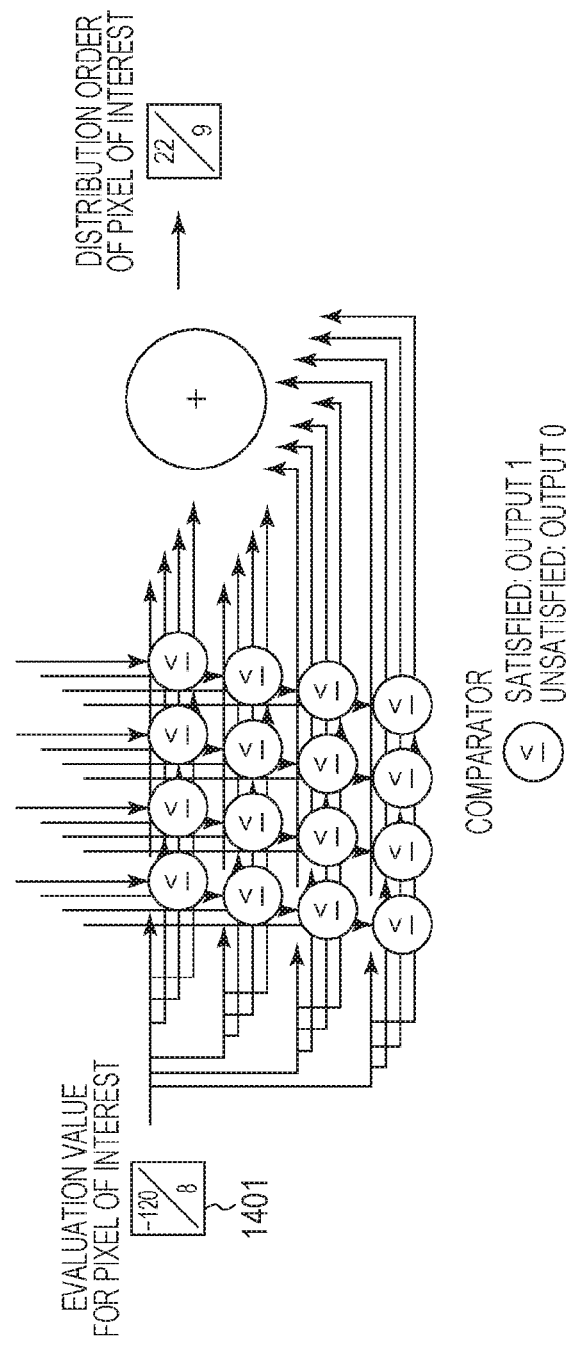
FIG. 14 illustrates a distribution order determination unit.

In step S1603, the comparison unit 1104 compares the evaluation value for the pixel of interest acquired in step S1602 and all evaluation values for pixels within the subject region acquired in step S1601 and calculates what number the evaluation value of the pixel of interest is. FIG. 14 illustrates a configuration of the comparison unit 1104. The evaluation value group 1005 is output from the first evaluation value calculation unit 1102. When the pixel of interest is a lower right pixel in the subject region, the second evaluation value calculation unit 1103 outputs an evaluation value 1401 for the pixel of interest. In this case, because two evaluation values are calculated for each pixel, the results of calculation of the evaluation value−120 and 8 are compared with all of 32 evaluation values for the subject region. If the evaluation value of the pixel of interest is lower or the equality is satisfied, 1 is output. If the equality is not satisfied, 0 is output. If the equality in the comparator is satisfied, the output value may be changed in accordance with the magnitude of the threshold value. As described above, according to this exemplary embodiment, the determination of the distribution order of output values is performed separately in units of pixel group and units of pixel in a predetermined region, and the sorting process is omitted by calculating the place in the order of magnitudes of evaluation values for each pixel. Therefore, the configuration according to this exemplary embodiment has advantages of a reduced interference between a characteristic of input image data and a characteristic of a threshold value matrix can be reduced as well as easy circuit implementation. Furthermore, highly accurate γ correction may be performed easily in accordance with a characteristic of an output device.

According to the third exemplary embodiment, the output value determination unit 205 can determine an output value of each pixel before finishing determining the distribution order of all pixels within the subject region. The output value determination unit 205 may determine an output value of a pixel of interest by comparing the place in the distribution order depending on what number of the magnitude of the evaluation value for the pixel of interest is and the target value of the subject region calculated by the totalization unit 603. In this case, the output value of the pixel of interest is determined as 0 if the place in the order of the evaluation value corresponding to a lower threshold value of two threshold values allocated to the pixel of interest is higher than the target value. The output value is determined as 1 if the place in the order of the evaluation value corresponding to the lower threshold value is equal to or lower than the target value and if the place in the order of the evaluation value corresponding to the higher threshold value is higher than the target value. The output value is determined as 2 if the place in the order of the evaluation value corresponding to the higher threshold value is lower than the target value. By calculating an output value of each pixel by the output value determination unit 205, the processing speed may be increased.

According to the aforementioned exemplary embodiments, the output values of pixels are determined unit region by unit region. According to a fourth exemplary embodiment, an output value is determined for each pixel. An application example will be described which is a window process for setting a neighborhood pixel group to a pixel of interest in order to determine an output value of the pixel of interest.

Figure 17:
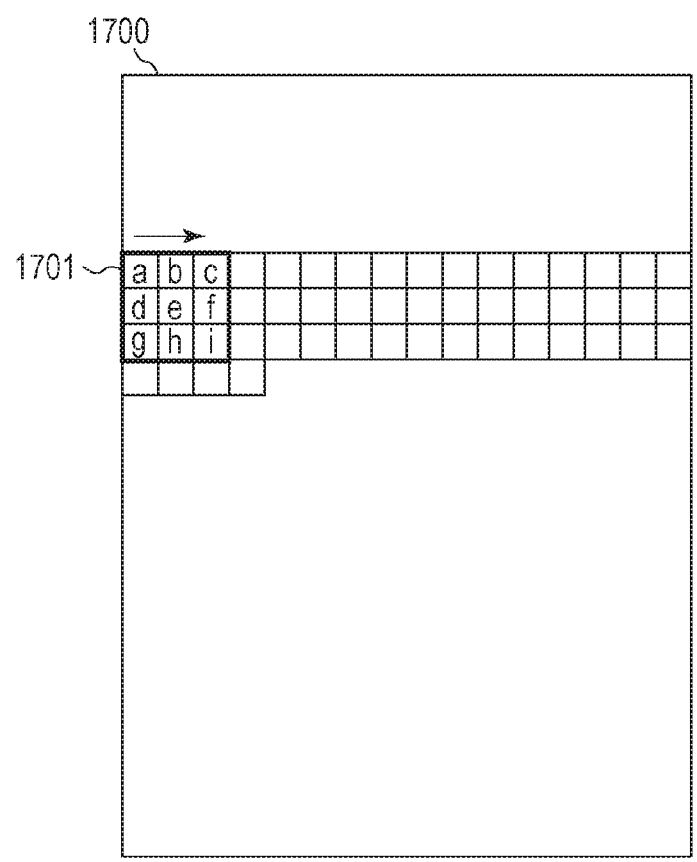
FIG. 17 illustrates a configuration example of input image data.
Figure 18A:
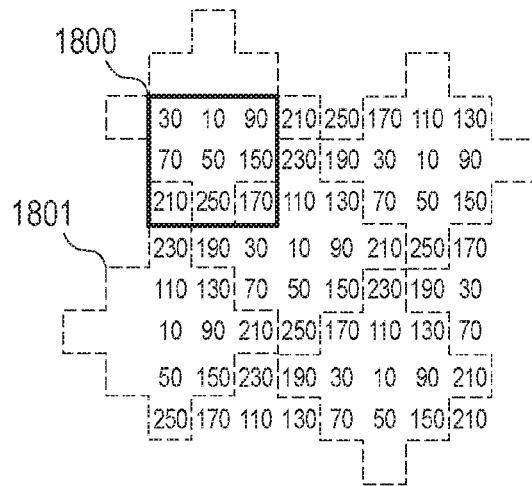
FIGS. 18A to 18D illustrate examples of AM-based threshold value matrices.
Figure 18B:
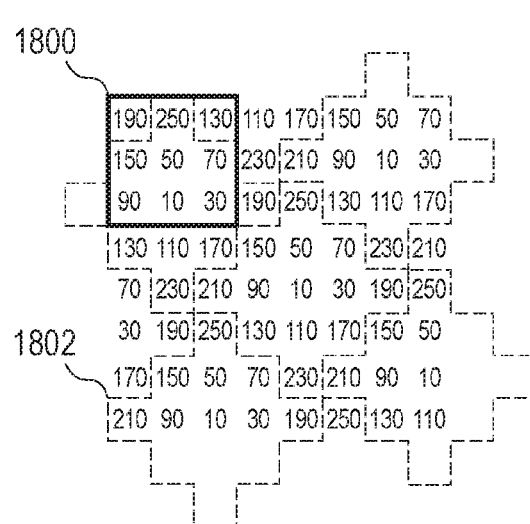
Figure 18C:
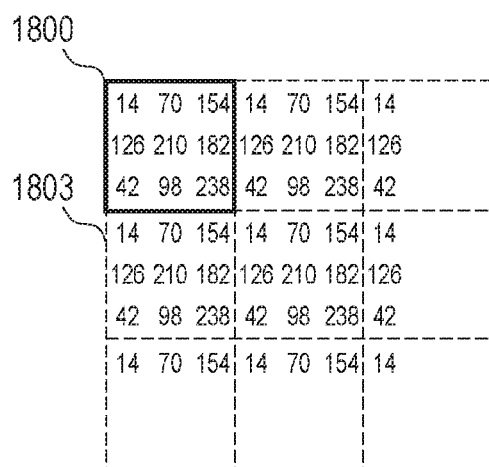
Figure 18D:
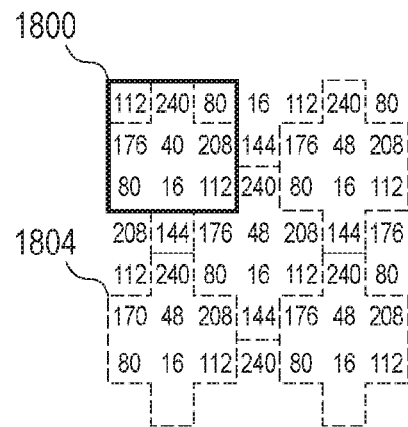

The configuration of the image processing unit 106 according to the fourth exemplary embodiment may be implemented by the same configuration as that of the aforementioned exemplary embodiment. According to this exemplary embodiment, as illustrated in FIG. 17, a 3×3 pixel region 1701 having a pixel of interest at its center is set for determining an output value of the pixel of interest in input image data 1700, and the window process is performed on every region 1701. The window process determines an output value of the pixel of interest based on a pixel group included in the region 1701. In this case, like the aforementioned exemplary embodiments, an evaluation value for each pixel is calculated based on its pixel value within the window and a corresponding threshold value for determination of distribution order. As a result of allocation of one output value to pixels within the region 1701 in the distribution order until the target value within the region 1701 is reached, the output value of the pixel of interest is determined. After the output value of the pixel of interest is determined, the region 1701 is shifted to the next by one pixel, and the pixel of interest is set to the right adjacent pixel. The output value of the pixel of interest is set. In accordance with the pixel group subject to such window processing, a 3×3 pixel region is extracted from a threshold value matrix for a threshold value group to process.

The operations to be performed by the image processing unit 106 are the same as those of the aforementioned exemplary embodiments except that an output value for a pixel of interest is only acquired as a result of a process in a predetermined region.

However, according to the fourth exemplary embodiment, the region 1701 has a pixel (such as pixels a, b, c, and d if processing is performed in order from the top column to the right) having an already settled output value. For distribution of target output values in the region 1701, the already settled output values may be reflected. Accordingly, the (an) output value of a pixel (such as pixels a to d) having an output value settled in advance is subtracted from the target value (totalization result of the dither process in step S903) in the region 1701. Regarding the evaluation value calculation, evaluation values for pixel (pixels c, f, and i in the region 1301) newly included in a 3×3 pixel region (window) after the window is moved.

By performing the processes above, the same effects as those of the aforementioned exemplary embodiments may be acquired.

According to the second exemplary embodiment, a threshold value matrix having a blue-noise characteristic is used as a concrete example. A fifth exemplary embodiment of the present invention is applied to an AM-based threshold value matrix to be used in half toning for the electrophotographic image formation unit 107 such as an laser beam printer. Because the configuration of the image processing unit 106 according to this exemplary embodiment may be implemented by the same configuration of the aforementioned exemplary embodiments, the description will be omitted.

FIGS. 18A to 18D illustrate a threshold value matrix used in the fifth exemplary embodiment. The threshold value matrix illustrated in FIGS. 18A to 18D is called an AM-based threshold value matrix or an AM screen. Performing a dither process by using an AM-based threshold value matrix may easily provide a dot pattern having concentrated dots arranged periodically. The threshold value matrix illustrated in FIGS. 18A to 18D has threshold value matrices 1801, 1802, 1803, and 1804 for different colors of C (cyan), M (magenta), Y (yellow), and K (black). A dither process using such a threshold value matrix may apply the same process according to the aforementioned exemplary embodiments so that the interference between a characteristic of input image data and a characteristic of a threshold value matrix may be reduced.

A unit region according to this exemplary embodiment may be a region having a size matched with the size of a threshold value matrix or a region including a cell and different pixel groups. Here, a common region 1800 (of 3 pixels×3 pixels) of the colors is a unit region. The size of the threshold value matrices 1801 and 1802 is equal to 13 pixels and is larger than the processing unit region 1800 (of 9 pixels). The size of the threshold value matrix 1803 is 3 pixels×3 pixels and is matched with the size of the unit region 1800. The size of the threshold value matrix 1804 is equal to 8 pixels and is smaller than the unit region 1800 (of 9 pixels). In both of the cases, performing the processing similarly to that of the aforementioned exemplary embodiments may provide the same effects.

According to the aforementioned exemplary embodiments, a difference between a pixel value and a threshold value is calculated for each pixel in input image data, and the difference is used as an evaluation value. According to a sixth exemplary embodiment, a two-dimensional table is referred for deriving an evaluation value from a pixel value and a threshold value, and an evaluation value for each pixel is determined. Because the configuration of the image processing unit 106 according to the sixth exemplary embodiment may be implemented by the same configuration of the aforementioned exemplary embodiments, the specific description on the components will be omitted.

According to the sixth exemplary embodiment, the distribution order determination unit 203 refers to a two-dimensional table and derives an evaluation value for each pixel by receiving input of pixel values of 0 to 255 and threshold values of 0 to 255. The two-dimensional table prestores evaluation values based on the pixel values and the threshold value in association. The evaluation value increases as the pixel value increases and decreases as the threshold value decreases in association, like the aforementioned exemplary embodiments. According to the sixth exemplary embodiment, a value "pixel value−threshold value" is associated in advance. The distribution order determination unit 203 derives evaluation values for all pixels in a subject region and then sorts the evaluation values in decreasing order to determine the distribution order.

According to this exemplary embodiment, performing the processing similarly to that of the aforementioned exemplary embodiments may provide the same effects.

The distribution order determination unit 203 may refer to a three-dimensional table from which an evaluation value is derived by using a pixel value and a pixel position (x-coordinate and y-coordinate) of a pixel included in input image data. In a threshold value matrix, a threshold value depends on a corresponding pixel position. Therefore, without direct input of a threshold value (distribution information) as described above, an evaluation value reflecting a corresponding threshold value may be output based on a pixel position.

Other Exemplary Embodiments

As described above, according to each of the aforementioned exemplary embodiments, a threshold value matrix is not used to be compared with a pixel value of each pixel to determining an output value of the pixel. Therefore, the same processing may be performed by using information describing places in order of pixels within a predetermined region as an index for calculating an evaluation value, without limiting to a threshold value matrix usable for a dither process. For example, in a case where a unit region is a 4×4 pixel region, places in order of pixels in the predetermined region may be within a 4-bit range of 0 to 16. In this case, in order to acquire matched degrees of influences of pixel values and order information to evaluation values, the range of input image data may be matched with the range of order information, and a difference between a pixel value and a corresponding place in the may then be calculated.

According to the aforementioned exemplary embodiments, a target value in a subject region is calculated by executing a dither process and totalization on (totaling of) results of substitution of pixel values of pixels by an average value of the pixel values within the subject region. However, without the substitution by an average value, the dither process may be performed directly on a pixel group in a subject region included in input image data. In this case, dots (output values) determined by a dither process using a normal threshold value matrix are to be re-distributed. This method also allows reflection of a characteristic of the input image data to the output results and reduction of degradation of image quality due to interference between the input image data and the threshold value matrix.

According to the aforementioned exemplary embodiments, "pixel value−threshold value" or "pixel value−α× threshold value" is calculated as an evaluation value for a pixel, and a decreasing order of evaluation values is determined as the distribution order. However, for example, "threshold value−pixel value" or "α×threshold value−pixel value" may be calculated as an evaluation value. In this case, an increasing order from a low evaluation value is determined as the distribution order to acquire the order of distribution of output values until the target value is acquired.

According to this exemplary embodiment, in a region including a plurality of pixels, as the pixel value increases and as the corresponding threshold value decreases, an evaluation value which allows easy distribution of an output value 1 by priority may be set for the pixel (earlier place in the distribution order). Furthermore, the coefficient α for controlling the degree of influence of a characteristic of input image data and the degree of influence of a characteristic of a threshold value matrix may be a coefficient to be multiplied by a pixel value as in "α×pixel value−threshold value".

Furthermore, according to this exemplary embodiment, one output value is allocated to each place in the distribution order until a sum of output values of a plurality of pixels in a subject region reaches a target value thereof. On the other hand, the distribution order may be determined from a pixel to which an output value 0 is allocated. For example, according to the first exemplary embodiment, evaluation values each acquired based on a difference between a pixel value and a threshold value are sorted in increasing order from a low value to a high value to determine the distribution order. The distribution order may be determined from a pixel to which an output value 0 is allocated, and an output value 1 may be allocated to the remaining pixels until a value acquired by subtracting a target value thereof from a sum of maximum output values representable by the subject region is reached. By performing this processing, the same processing as that of the aforementioned exemplary embodiments may be implemented.

Any one of the aforementioned exemplary embodiments and a known dither process may be combined. According to the aforementioned exemplary embodiment, in a case where a subject region in input image data is flat (with pixels having an equal pixel value), the evaluation values may only depend on threshold values. In other words, it provides the same result as that of a known dither process for determining output values by comparing pixel values of pixels in the subject region and corresponding threshold values. Accordingly, an attribute indicative of whether each subject region is flat or not is detected from input image data. If a subject region is flat, the known dither process is executed. If not, the process for determining the distribution order using evaluation values according to an aforementioned exemplary embodiment is performed, and the process for determining output values is then executed. As described above, the aforementioned exemplary embodiments may be combined with a known process.

Having described an exemplary embodiment in which an image process is executed by a hardware configuration, the present invention may also be implemented by a circuit (such as an ASIC) which implements one or more functions. The present invention may be implemented by software. In this case, the image processing apparatus is not internally provided in an image formation system as in the aforementioned exemplary embodiments but is installed as software to be stored in memory of a general computer such as a personal computer (PC). Software installed in a CPU of a computer may read and execute a program based on the flowchart according to any one of the aforementioned exemplary embodiments to implement functions of the components. For example, the target value calculation process may be executed by a first CPU, and a target value may be accumulated in an external memory. In parallel with it, the distribution order determination process may be executed by a second CPU, and distribution order may be accumulated in the external memory. Then, the target value and distribution order may be read out from the external memory, and the output value determination process may be executed by a third CPU. Furthermore, the software processes performed by the CPUs and hardware implemented by dedicated processing circuits may be combined to execute the processes in the corresponding processing units in parallel.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image processing apparatus comprising:
a holding unit configured to hold a threshold value matrix including a plurality of threshold values;
a target value acquiring unit configured to acquire, on a basis of pixel values of pixels included in a predetermined region of an input image and a threshold value group which, in the threshold value matrix, corresponds to the predetermined region, a target value for the predetermined region; and an output value determination unit configured to determine output values of the pixels included in the predetermined region in accordance with the target value, the threshold value group and the pixel values.

2. The image processing apparatus according to claim 1, wherein the output value determination unit determines the output values of the pixels included in the predetermined region in a manner such that sum of the output values in the predetermined region becomes the target value of the predetermined region.

3. The image processing apparatus according to claim 1, wherein the output value determination unit determines a position at which a pixel, among the pixels included in the predetermined region, of which an output value is to be set to equal to or higher than 1 is provided on a basis of the pixel values and the threshold values.

4. The image processing apparatus according to claim 1, wherein the target value acquiring unit derives the target value by using a dither process with the threshold value group.

5. The image processing apparatus according to claim 1, further comprising:
a first evaluation value determination unit configured to determine evaluation values of the pixels included in the predetermined region on a basis of the pixel values of the pixels and the threshold values corresponding to the pixels;
a second evaluation determination unit configured to determine, with respect to a pixel of interest included in the predetermined region, an evaluation value of the pixel of interest on a basis of a pixel value of the pixel of interest and a threshold value corresponding to the pixel of interest; and
a comparison unit configured to perform, for each of the pixels included in the predetermined region, comparison of an evaluation value with the evaluation value of the pixel of interest,
wherein the output value determination unit determines an output value of the pixel of interest in accordance with a result of the comparison performed by the comparison unit.

6. The image processing apparatus according to claim 5, wherein the comparison unit calculates what number of a magnitude of the evaluation value of the pixel of interest is among the pixels included in the predetermined region by performing the comparison.

7. The image processing apparatus according to claim 6, wherein the output value determination unit determines to set the output value of the pixel of interest to 0 in a case where a place in an evaluation value order of the evaluation value of the pixel of interest is higher than the target value in the predetermined region.

8. The image processing apparatus according to claim 1, wherein the output values indicate whether dots are arranged or not.

9. The image processing apparatus according to claim 8, wherein the output value determination unit arranges, in the predetermined region, the dots for a number corresponding to the target value, and
wherein positions of the dots in the predetermined region are determined in accordance with the threshold value group and the pixel values.

10. A non-transitory computer-readable storage medium storing instructions that, when executed by a computer, cause the computer to perform a method comprising:
reading pixel values of pixels included in a predetermined region of an input image;
reading, from a threshold value matrix including a plurality of threshold values, a threshold value group corresponding to the predetermined region;
acquiring, on a basis of the pixel values of the pixels included in the predetermined region and the threshold value group corresponding to the predetermined region, a target value for the predetermined region; and
determining output values of the pixels included in the predetermined region in accordance with the target value, the threshold value group and the pixel values.

11. An image processing method comprising:
reading pixel values of pixels included in a predetermined region of an input image;
reading, from a threshold value matrix including a plurality of threshold values, a threshold value group corresponding to the predetermined region;
acquiring, on a basis of the pixel values of the pixels included in the predetermined region and the threshold value group corresponding to the predetermined region, a target value for the predetermined region; and
determining output values of the pixels included in the predetermined region in accordance with the target value, the threshold value group and the pixel values.

* * * * *